US005736664A

United States Patent [19]

Ito et al.

[11] Patent Number: 5,736,664

[45] Date of Patent: Apr. 7, 1998

[54] AUTOMATIC ACCOMPANIMENT DATA-PROCESSING METHOD AND APPARATUS AND APPARATUS WITH ACCOMPANIMENT SECTION SELECTION

[75] Inventors: Shinichi Ito; Masao Kondo; Keiji Kawakami, all of Hamamatsu, Japan

[73] Assignee: Yamaha Corporation, Japan

[21] Appl. No.: 627,082

[22] Filed: Apr. 3, 1996

[30] Foreign Application Priority Data

Apr. 3, 1995 [JP] Japan .................................... 7-077505

[51] Int. Cl.$^6$ .............................. G09B 15/02; G10H 1/36

[52] U.S. Cl. .............................. 84/634; 84/645; 84/477 R

[58] Field of Search ..................... 84/609–614, 634–638, 84/645, 477 R, DIG. 12, DIG. 22

[56] References Cited

U.S. PATENT DOCUMENTS

| | | | |
|---|---|---|---|
| 4,339,978 | 7/1982 | Imamura | 84/610 |
| 5,164,531 | 11/1992 | Imaizumi et al. | 84/634 |
| 5,200,566 | 4/1993 | Shimaya | 84/609 |
| 5,208,416 | 5/1993 | Hayakawa et al. | 84/634 |
| 5,393,927 | 2/1995 | Aoki | 84/634 X |
| 5,461,192 | 10/1995 | Imaizumi | 84/634 |
| 5,541,355 | 7/1996 | Kondo et al. | 84/610 |

FOREIGN PATENT DOCUMENTS 59-197090 11/1984 Japan .

*Primary Examiner*—Stanley J. Witkowski
*Attorney, Agent, or Firm*—Rossi & Associates

[57] ABSTRACT

Automatic accompaniment performance data for a plurality of sections of a musical piece are stored. One of the plurality of sections is designated. Automatic accompaniment performance data for the designated one section from the automatic performance data for the plurality of sections is read out to play automatic accompaniment performance. Automatic accompaniment performance data for another section is used in place of the automatic accompaniment performance data for the designated one section if the automatic accompaniment performance data for the designated on section is not stored.

23 Claims, 21 Drawing Sheets

AUTOMATIC ACCOMPANIMENT DATA-PROCESSING METHOD AND APPARATUS AND APPARATUS WITH ACCOMPANIMENT SECTION SELECTION

BACKGROUND OF THE INVENTION

1. Field of the Invention

This invention relates to an automatic accompaniment performance data-processing method which processes automatic accompaniment performance data formed according to a plurality of sections and a plurality of variations of a style of a musical piece for changing an accompaniment performance pattern during automatic accompaniment performance, and an automatic accompaniment apparatus to which the method is applied.

2. Prior Art

In conventional automatic accompaniment apparatuses, automatic accompaniment performance pattern data having a length of one to several bars, which correspond to respective styles (i.e. genres) of music, such as rock and country-and-western, are stored in a memory device, and automatic accompaniment data is read from the memory device, which corresponds to a selected style of music, to thereby perform automatic accompaniment. There are provided automatic accompaniment performance patterns corresponding to respective sections of a musical piece, to vary the accompaniment performance pattern during automatic accompaniment performance. That is, the automatic accompaniment performance pattern is classified into a main performance pattern for performing a basic accompaniment performance throughout a musical piece, an introduction performance pattern which is inserted at the beginning of performance of a musical piece, a fill-in performance pattern which is inserted at blank portions between adjacent bars or passages, and an ending performance pattern which is inserted at the end of performance of a musical piece. Further, these accompaniment performance patterns vary in accordance with the kind of a variation of each style of music.

The conventional automatic accompaniment apparatuses, however, employ different formats of automatic accompaniment performance data which are exclusively applicable to respective corresponding types of apparatuses. Further, there are provided variation patterns for respective normal patterns of each style of music mentioned above. The conventional automatic accompaniment apparatuses employ respective unique methods of processing automatic accompaniment performance data including variation pattern data. Therefore, it has been difficult to commonly use the same automatic accompaniment performance data as well as new automatic accompaniment performance data prepared by the use of a computer, a music sequencer or the like between different types of apparatuses for efficient utilization of automatic accompaniment performance data.

SUMMARY OF THE INVENTION

It is a first object of the invention to provide a method of processing automatic accompaniment performance data, which has enhanced versatility of use of automatic accompaniment performance data between the present apparatus and other types of apparatuses.

It is a second object of the invention to provide an automatic accompaniment apparatus employing the method of the first object.

To attain the first object, according to a first aspect of the invention, there is provided a method of processing automatic accompaniment performance data, comprising the steps of storing automatic accompaniment performance data for a plurality of sections of a musical piece, designating one of the plurality of sections, reading automatic accompaniment performance data for the designated one section from the automatic accompaniment performance data for the plurality of sections to play automatic accompaniment performance, and using automatic accompaniment performance data for another section in place of the automatic accompaniment performance data for the designated one section if the automatic accompaniment performance data for the designated one section is not stored.

For example, the plurality of sections include a main section, an introduction section, a fill-in section, and an ending section. The automatic accompaniment performance data used in place of the automatic accompaniment performance data for the designated one section is automatic accompaniment performance data for the main section.

Preferably, the automatic accompaniment performance data for the plurality of sections comprise a sequence of automatic accompaniment performance data stored as a file. The sequence of automatic accompaniment performance data each is formed of a pair of a marker and performance data arranged adjacent thereto. The marker discriminates the performance data of the pair thereof from performance data of other automatic accompaniment performance data of the sequence of automatic accompaniment performance data.

More preferably, the marker includes discriminating information indicative of an section to which the performance data of the pair thereof corresponds.

Also preferably, the file is in a format of a standard MIDI file.

More preferably, the file has a file name having an extension added thereto. The file is employed as the automatic accompaniment performance data when the extension of the file agrees with a predetermined extension.

Further preferably, the file includes ID information indicating that the file is the automatic accompaniment performance data, the file being employed as the automatic accompaniment performance data when the extension of the file agrees with the predetermined extension and at the same time the ID information agrees with predetermined ID information.

More preferably, the performance data arranged adjacent to the marker includes note-on data and note-off data corresponding thereto. A note-off event is forcedly generated at the end of the performance data during performance thereof when the performance data does not contain the note-off data corresponding to the note-on data.

To attain the first object, according to a second aspect of the invention, there is provided a method of processing automatic accompaniment performance data, comprising the steps of storing automatic accompaniment performance data for a plurality of variations for each of a plurality of sections of a musical piece, designating one of the plurality of variations, reading automatic accompaniment performance data for the designated one variation from the accompaniment performance data for the plurality of variations for each of the plurality of sections to play automatic accompaniment performance, and using automatic accompaniment performance data for another variation in place of the automatic accompaniment performance data for the designated one variation if the automatic accompaniment performance data for the designated one variation is not stored.

Preferably, the plurality of variations are given a predetermined order of priority. The automatic accompaniment performance data used in place of the automatic accompaniment performance data for the designated one variation is automatic accompaniment performance data for a variation which is nearest in the predetermined order of priority to the designated one variation.

Preferably, the automatic accompaniment performance data for the plurality of variations comprise a sequence of automatic accompaniment performance data stored as a file. The sequence of automatic accompaniment performance data each is formed of a pair of a marker and performance data arranged adjacent thereto, the marker discriminating the performance data of the pair thereof from performance data of other automatic accompaniment performance data of the sequence of automatic accompaniment performance data.

Preferably, the marker includes discriminating information indicative of a variation to which the performance data of the pair thereof corresponds.

More preferably, the file is in a format of a standard MIDI file.

More preferably, the file has a file name having an extension added thereto. The file is employed as the automatic accompaniment performance data when the extension of the file agrees with a predetermined extension.

Further preferably, the file includes ID information indicating that the file is the automatic accompaniment performance data. The file is employed as the automatic accompaniment performance data when the extension of the file agrees with the predetermined extension and at the same time the ID information agrees with predetermined ID information.

More preferably, the performance data arranged adjacent to the marker includes note-on data and note-off data corresponding thereto. A note-off event is forcedly generated at the end of the performance data during performance thereof when the performance data does not contain the note-off data corresponding to the note-on data.

More preferably, the plurality of variations are variations of each of a plurality of styles of music. The file stores information on a name of one of the plurality of styles of music in a first natural language, and information on the name of the one of the plurality of styles of music in a second natural language, if required. The name of the one of the plurality of styles of music of the automatic accompaniment performance data is displayed in the second natural language when an apparatus using data of the file is capable of displaying the name of the each of the plurality of styles of music in the second natural language, whereas the name of the one of the plurality of styles of music of the automatic accompaniment performance data being displayed in the first natural language when the apparatus using data of the file is not capable of displaying the name of the each of the plurality of styles of music in the second natural language.

To attain the second object, according to a third aspect of the invention, there is provided an automatic accompaniment performance apparatus, comprising, memory means for storing automatic performance data for a plurality of sections of a musical piece, designating means for designating one of the plurality of sections, determining means for determining whether automatic accompaniment performance data for the one section designated by the designating means is stored in the memory means, changeover means for changing the designated one section to a predetermined section when the determining means determines that the automatic accompaniment performance data for the designated section is not stored in the memory means, reading means for reading the automatic accompaniment performance data for the designated one section or the predetermined section, and output means for delivering musical tone information based on the automatic accompaniment performance data read by the reading means.

Preferably, the plurality of sections include a main section, an introduction section, a fill-in section, and an ending section. The changeover means changes the automatic accompaniment performance data for the designated one section to automatic accompaniment performance data for the main section.

To attain the second object, according to a fourth aspect of the invention, there is provided an automatic accompaniment performance apparatus, comprising memory means for storing automatic performance data for a plurality of variations for each of a plurality of sections of a musical piece, designating means for designating one of the plurality of variations, determining means for determining whether automatic accompaniment performance data for the one variation designated by the designating means is stored in the memory means, changeover means for changing the designated one variation to a predetermined variation when the determining means determines that the automatic accompaniment performance data for the designated one variation is not stored in the memory means, reading means for reading the automatic accompaniment performance data for the designated one variation or the predetermined variation, and output means for delivering musical tone information based on the automatic accompaniment performance data read by the reading means.

Preferably, the plurality of variations are given a predetermined order of priority, the changeover means changing the designated one variation to a variation which is nearest in the predetermined order of priority to the designated one variation.

The above and other objects, features, and advantages of the invention will become more apparent from the following detailed description taken in conjunction with the accompanying drawings.

DETAILED DESCRIPTION

The invention will now be described in detail with reference to drawings showing an embodiment thereof.

Figure 2:
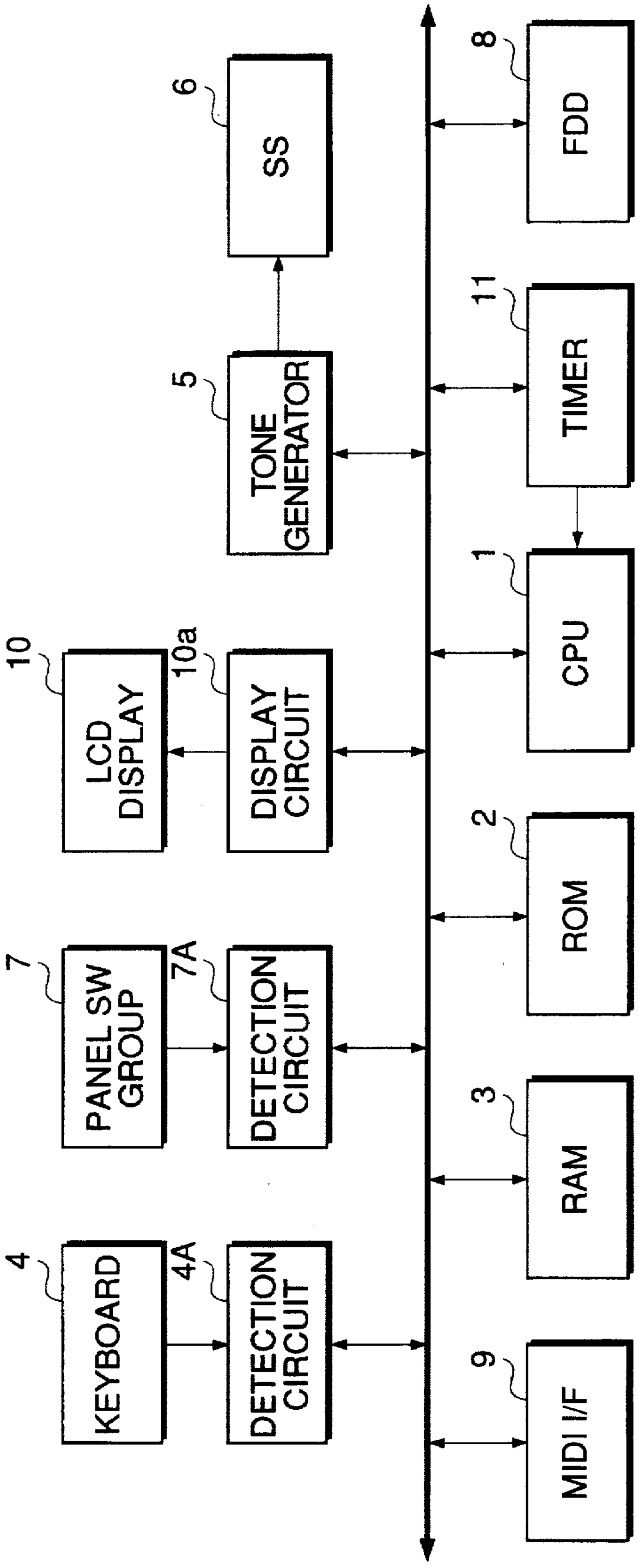
FIG. 2 is a block diagram showing the whole hardware arrangement of the electronic musical instrument.

Referring first to FIG. 2, there is shown the whole hardware arrangement of an electronic musical instrument to which is applied the method according to an embodiment of the invention. The electronic musical instrument includes a CPU 1 which controls the overall operation of the electronic musical instrument based on a control program stored in a ROM 2 and by the use of a working area of a RAM 3. When performance is given, the CPU 1 receives information on key codes, key-on signals, etc. from a keyboard 4 via a detection circuit 4A, and based the information, controls a tone generator 5 to generate a musical tone signal, which is supplied to a sound system (SS) 6, where the signal is converted into musical tones. Further, the CPU 1 receives input data from various operators and switches (hereinafter referred to as "the panel switch group") 7 in an operation panel via a detection circuit 7A, and executes processing in response to operative states of operators and switches of the panel switch group 7.

This processing responsive to the operative states of the operators and switches of the panel switch group 7 includes processing for reading automatic accompaniment performance data from a disk set in a floppy disk drive (FDD) 8, processing for receiving automatic accompaniment performance data from an external device via a MIDI interface 9, processing for starting and stopping automatic accompaniment performance, processing for changing over sections or variations of automatic accompaniment performance, processing for controlling an LCD display 10 via a display circuit 10*a*, etc.

The electronic musical instrument also includes a timer 11 which generates an interrupt signal at timing determined by tempo information and resolution of performance data set by the CPU 1, and the CPU 1 executes interrupt processing in response to the interrupt signal for controlling automatic accompaniment performance. Then, according to a style of music currently selected by the player, the CPU 1 selectively reads out automatic accompaniment performance data preset in the ROM 2 or automatic accompaniment performance data stored in the RAM 3 to give automatic accompaniment performance.

Figure 3:
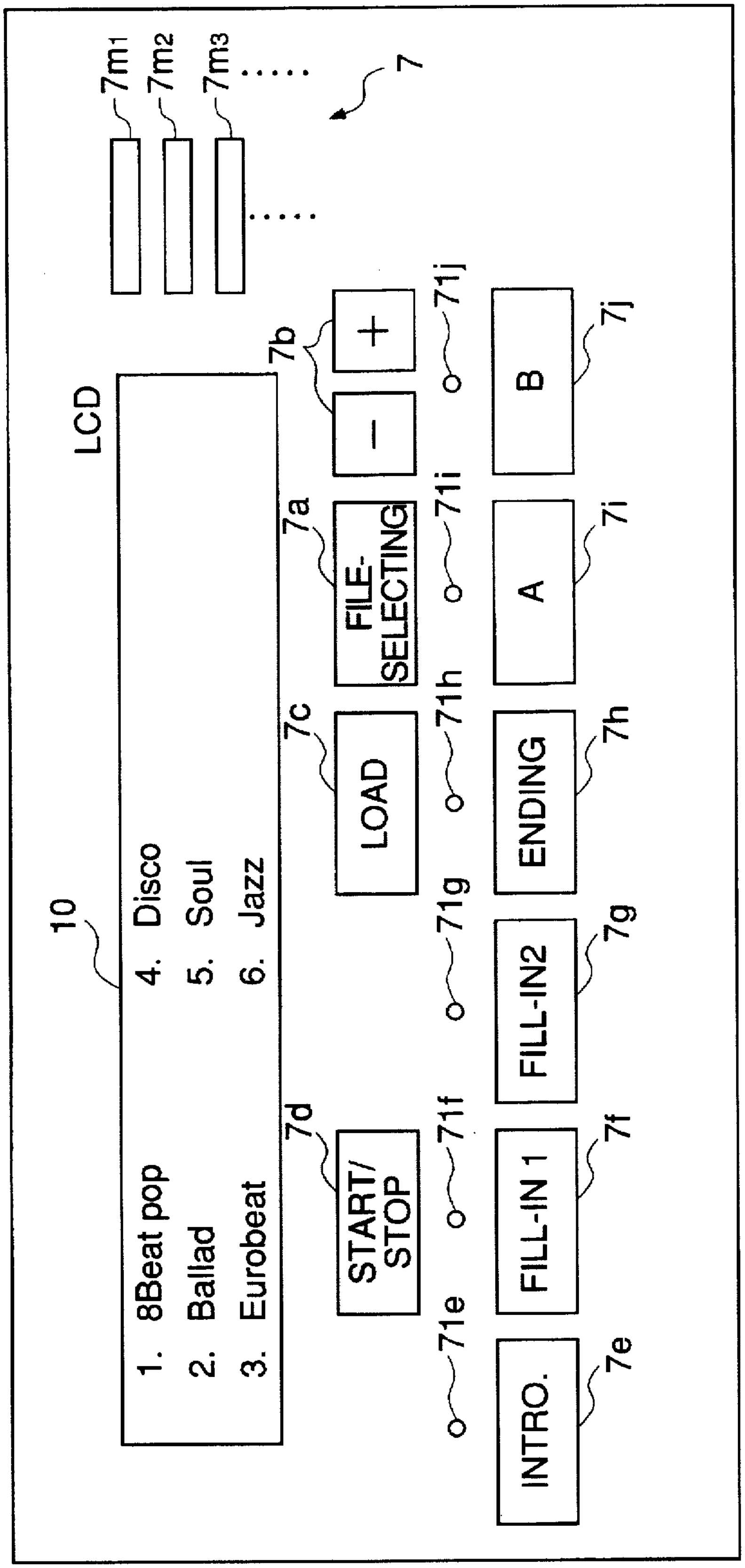
FIG. 3 is a diagram schematically showing the arrangement of essential parts of an operation panel of the electronic musical instrument.

FIG. 3 schematically shows the arrangement of essential parts of an operation panel surface of the electronic musical instrument according to the embodiment. The panel switch group 7 is arranged around the LCD display 10. The panel switch group 7 includes a file-selecting switch 7*a* for designating a mode for selecting a file from data stored in the disk, a ± switch 7*b* for moving a cursor for selecting a file name from file names displayed on the LCD display 10 to designate a file, and a load switch 7*e* for loading the file of automatic accompaniment performance data having the file name selected by the cursor.

Further, the panel switch group 7 includes a start/stop switch 7*d* for instructing start or stop of automatic accompaniment performance, an introduction switch 7*e* for designating an introduction accompaniment performance, a fill-in 1 switch 7*f* for designating a fill-in accompaniment performance during a fill-in 1 mode, a fill-in 2 switch 7*g* for designating a fill-in accompaniment performance during a fill-in 2 mode, an ending switch 7*h* for designating an ending accompaniment performance, an A switch 7*i* for designating a variation A, and a B switch 7*j* for designating a variation B.

Arranged, respectively, at locations just above the introduction switch 7*e*, the fill-in 1 switch 7*f*, the fill-in 2 switch 7*g*, the ending switch 7*h*, the A switch 7*i*, and the B switch 7*j* are LED's 71*e*, 71*f*, 71*g*, 71*h*, 71*i*, and 71*j* which are lighted when the respective corresponding switches are operated.

The panel switch group 7 further includes style switches 7*m*1, 7*m*2, 7*m*3, . . . The style switch 7*m*1 is assigned to a style of automatic accompaniment performance data loaded, and the other style switches 7*m*2, 7*m*3, . . . are assigned to styles of respective automatic accompaniment data preset in the ROM 2. More specifically, during automatic accompaniment performance, if the style switch 7*m*1 is operated, a file of automatic performance data loaded from the disk is selected, while any of the other style switches 7*m*2, 7*m*3, . . . is operated, a file of automatic performance data preset in the ROM and corresponding to the operated switch is selected for use in automatic accompaniment.

Figure 1:
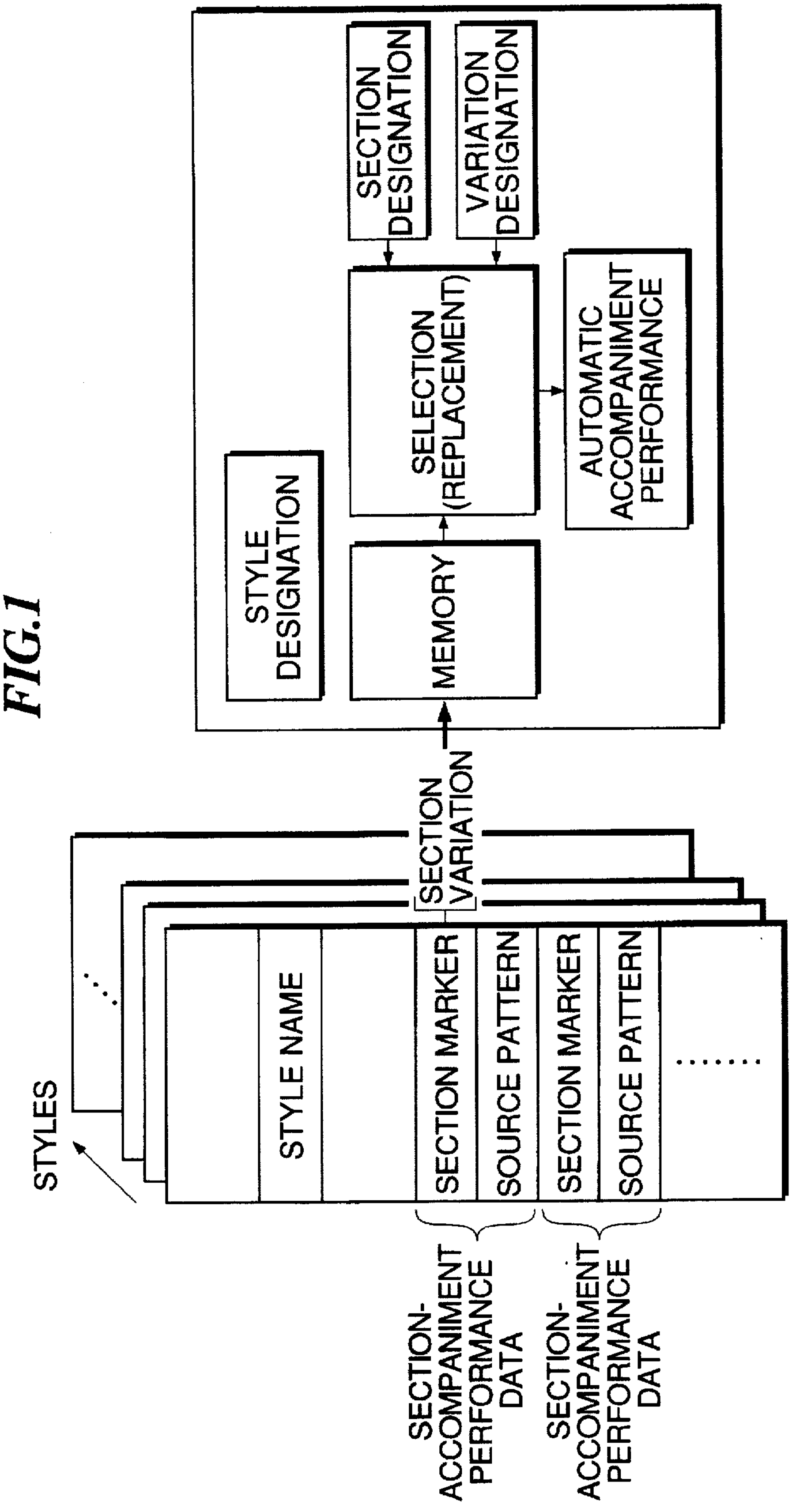
FIG. 1 is a diagram which is useful in explaining automatic accompaniment performance data processed by the method according to an embodiment of the invention, and essential functions executed by an electronic musical instrument employing the method.

FIG. 1 schematically shows a file of automatic accompaniment performance data supplied from a disk, and essential functions executed by the electronic musical instrument for automatic accompaniment performance based on the file of automatic accompaniment performance data. In the present embodiment, automatic accompaniment performance data for various styles are supplied from a disk as a library, as shown in FIG. 1. This library is a collection of files of automatic accompaniment performance data, each file corresponding to a style. Each file contains data indicative of a style name, and section-accompaniment performance data indicative of accompaniment performance patterns to be used at respective sections of automatic accompaniment performance. The section-accompaniment performance data are each formed by a pair of a section marker and a source pattern. Further, the section marker contains section information and variation information, as described hereinbelow.

From the library of automatic accompaniment performance data supplied from a disk, a file of automatic accompaniment data of a desired style is selected and read from the disk and loaded into the memory (RAM 3) by a style-designating function of the electronic musical instrument executed when the player operates the file-selecting switch *7a*, the ±switch *7b*, and the load switch *7c*.

During automatic accompaniment performance, the CPU 1 executes a selecting function to retrieve a source pattern based on a corresponding section marker from the memory, which corresponds to a section designated by a section-designating function executed when the player operates the start/stop switch *7d*, the introduction switch *7e*, the fill-in 1 switch *7f*, the fill-in 2 switch *7g*, or the ending switch *7h*, and a variation designated by a variation-designating function executed when the player operates the A switch *7i* or the B switch *7j*. Then, the CPU 1 executes an automatic accompaniment performance function to read data corresponding to the retrieved source pattern from the memory to give automatic accompaniment performance. The retrieved source pattern data is subjected to pitch conversion based on a detected chord of information supplied from the keyboard 4 as carried out by an ordinary automatic accompaniment apparatus, before it is supplied the tone generator 5.

When changeover to a new section is designated by execution of the section-designating function during automatic accompaniment performance, the CPU 1 then executes the selecting function to retrieve and read a source pattern corresponding to the newly designated section to thereby replace the immediately preceding source pattern by the newly retrieved one. On this occasion, if no section-accompaniment performance data is found which corresponds to the newly designated section and the currently selected variation, section-accompaniment data having a higher priority is selected according to an order of priority imparted to the variations.

Figure 4:
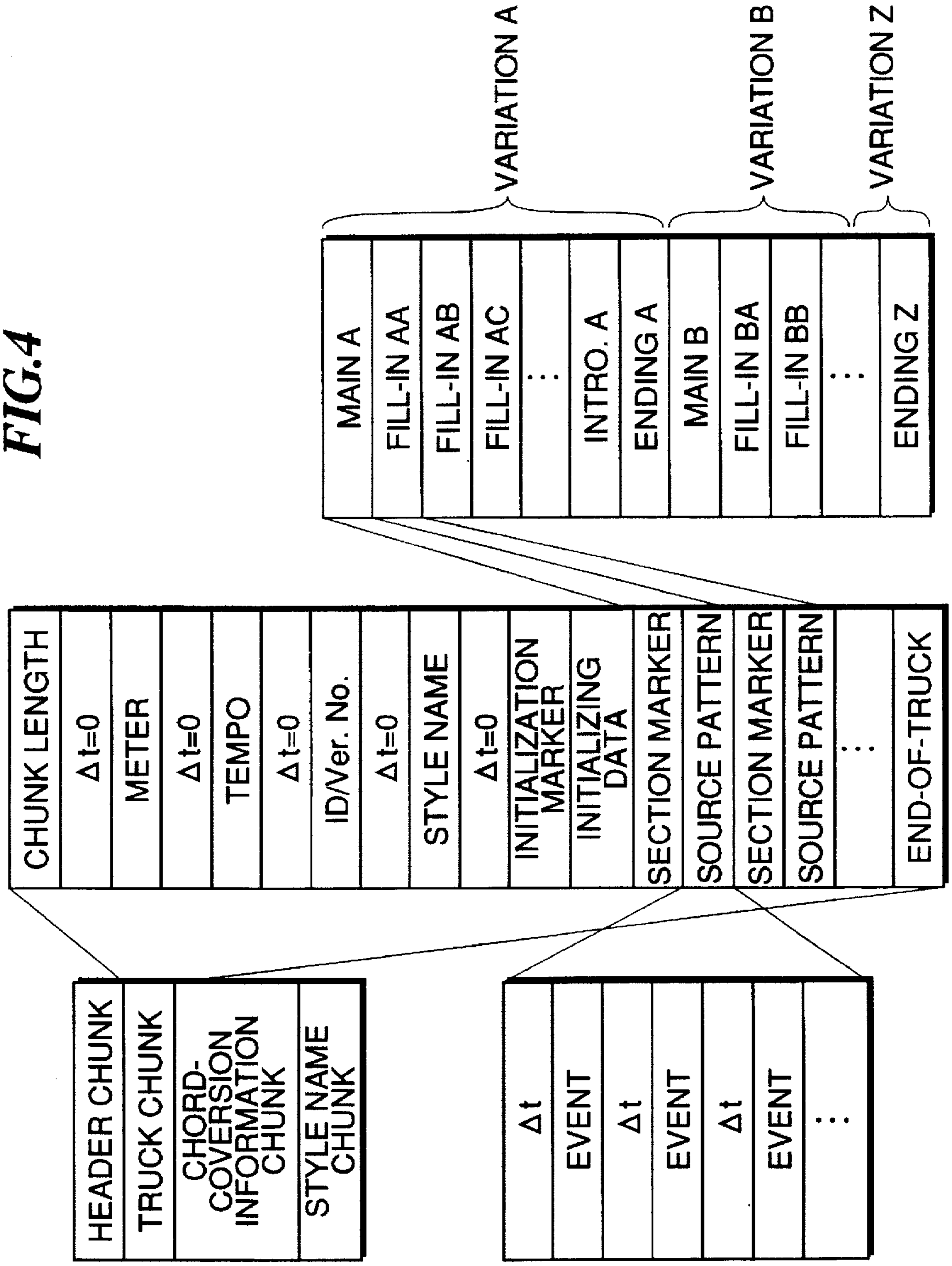
FIG. 4 is a diagram showing, by way of example, a format of a file of automatic accompaniment performance data corresponding to a style of music.

FIG. 4 shows an example of a format of a file of automatic accompaniment performance data corresponding to a style. This file of automatic accompaniment performance data is divided into four chunks: a header chunk which is comprised of data indicative of resolution of performance data (e.g. the number of interrupt clocks per quarter note), a truck chunk which is comprised of data related to actual accompaniment performance itself, including data indicative of a style name and data indicative of a number of section-accompaniment performance data, a chord-conversion information chunk which is comprised of chord-converting information for converting pitch of a source pattern according to a chord designated during automatic accompaniment performance or executing pitch conversion according to a specific chord or part of performance, and a style name chunk which is comprised of data for displaying a style name in a language other than English. The chord conversion chunk and the style name chunk may be omitted if required.

The truck chunk includes data indicative of a chunk length, data indicative of a meter, such as 4/4 times, data indicative of tempo, data ID indicative of the present file being automatic accompaniment performance data, and data indicative of the version number, data indicative of a style name for use in displaying a style name in English, data indicative of an initialization marker which indicates that the next data is initializing data. The initializing data is for initializing tone color, volume, an effect control parameter, etc.

In the present embodiment, the data supplied from the disk are in the format of the standard MIDI file, and therefore data indicative of delta time (Δt) is interposed between adjacent data items enumerated above. If the delta time is not equal to "0", the next data is read after a time interval specified by the delta time. In the illustrated example, all the delta times of the automatic accompaniment performance data are set to "0" so that the data are read almost at the same time. Further, the data ID indicates that the present file is data other than automatic accompaniment performance data, if the present file is not automatic accompaniment indicative data.

Further, the truck chunk includes a number of section-accompaniment performance data each formed of a pair of a section marker and a source pattern, which follow the initializing data, each pair corresponding to a combination of a section and a variation. Arranged at the end of the truck channel is end-of-truck data which indicates the end of the truck chunk.

Each source pattern data is formed by event data each indicative of an event for tone generation control, and delta time data (Δt) each specifying a time interval (duration) between adjacent events. Further, the event data include note event data indicative of note-on/note-off, pitch bend data indicative of a change in musical interval, after-touch data indicative of a variation in volume, etc. based on a key operation following a note-on event, volume data indicative of standard volume, program change data indicative of tone color, etc. These data each also contain a channel number indicative of a base part, a chord part, a drum part, or the like, thus forming performance data for a plurality of parts of a musical piece.

During automatic accompaniment performance, time is counted with the same degree of time resolution as that of delta times to store a time period currently elapsed in each bar.

The section marker of each section-accompaniment performance data is formed by data indicative of a section of main, fill-in, introduction, or ending, and data indicative of one of variations A to Z, whereby the items of the section-accompaniment performance data are arranged in a predetermined order, for example, main AA, fill-in AA, fill-in AB, fill-in AC, . . . , introduction A, ending A, . . . , as shown in FIG. 4. That is, as for the performance sections, the items of the section-accompaniment data are arranged in the order of "main"→"fill-in"→"introduction"→"ending". Further, as for the variations, they are given a predetermined order of priority, i.e. the order of "A"→"B"→. . . →+"Z".

Further, each fill-in data is followed by data indicative of a variation to be played after performance of the present fill-in pattern is completed (hereinafter referred to as "destination variation"). For example, when performance of the accompaniment performance pattern of the section-accompaniment performance data "fill-in AB", which in itself belongs to the variation A, is completed, the accompaniment performance pattern is changed over to one belonging to the variation B.

The data of the section marker of each section formed of a combination of data indicative of one of the above sections, such as "main" and data indicative of one of the variations, such as "A", is stored in a register "CSECT" (current section) when the section is designated, while the data of the section marker of a section immediately following the currently designated section is stored in a register "NSECT" (next section), as described hereinafter.

Figure 5:
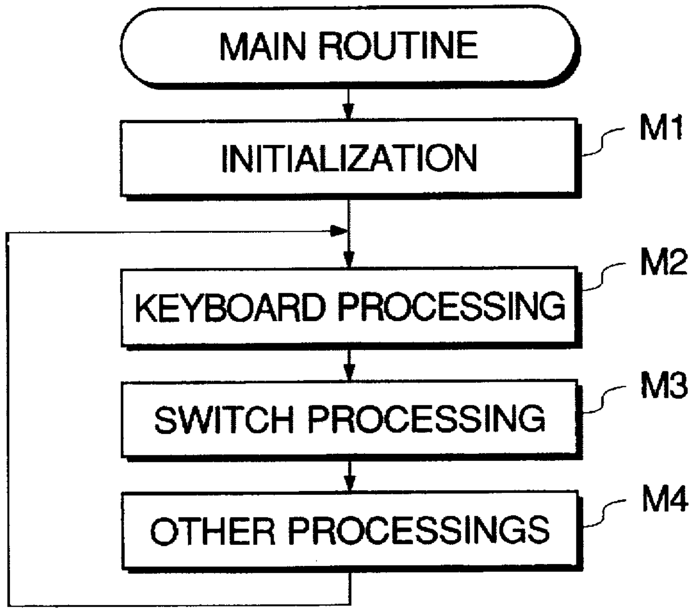
FIG. 5 is a flowchart showing a main routine executed by the electronic musical instrument.

FIG. 5 shows a main routine of the control program executed by the CPU 1 according to the present embodiment. FIGS. 6 to 23 show interrupt handling routines and subroutines of the control program. The operation of the electronic musical instrument according to the present embodiment will be described with reference to these figures. In the following description and these figures, registers and flags are designated by the following symbols, with each of the registers and flags and a value thereof being designated by a common symbol, unless otherwise specified:

FSEL: a flag indicating that a file can be selected from the disk;

CSECT: a register for temporarily storing data indicative of a section marker of section-accompaniment data being used for the present automatic accompaniment performance;

NSECT: a register for temporarily storing data of a section marker of section-accompaniment data to be used for the next automatic accompaniment performance;

TIME: a register for temporarily storing a delta time in a source pattern; and

RUN: a flag indicating start/stop of automatic accompaniment performance.

Referring to FIG. 5, when the power is turned on, the CPU 1 starts processing according to the main routine. That is, first, at a step M1, an initialization processing, such as resetting of the flags and registers is executed, and at a step M2, a keyboard processing such as sounding or stopping sounding and detection of a chord, is executed based on results of a determination as to whether any key event has occurred at the keyboard 4, etc. At a step M3, a switch processing is executed in response to operation of each of the switches of the panel switch group 7. Then, at a step M4, other processings are executed, and after completion of these processings, the program returns to the step M2, followed by repeatedly executing the steps M2 et seq.

In the initializing processing of the step M1, resetting of the flags and registers is carried out such that FSEL=0, CSECT=main A, NSECT=main A, TIME=0, and RUN=0. The values of the registers CSECT and NSECT are selectively designated according to the operator's operation of the introduction switch 7*e*, the fill-in 1 switch 7*f*, the fill-in 2 switch 7*g*, the ending switch 7*h*, the A switch 7*i*, and the B switch and the actual operative states of the switches before the operator's operation.

Figure 6:
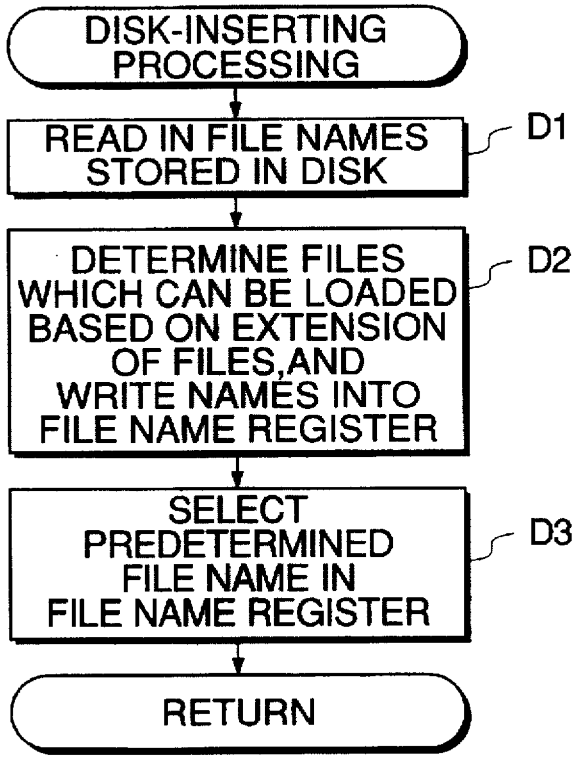
FIG. 6 is a flowchart showing a routine of a disk-insertion processing.

FIG. 6 shows an interrupt handling routine for a disk-insertion processing, which is executed when a disk is inserted into the floppy disk drive 8. First, at a step D1, data of file names stored in the disk are read in, and at a step S2, it is determined, based on an extension of each file name, whether each file can be loaded, i.e. whether the file is automatic accompaniment performance data which can be loaded or automatic accompaniment performance data which can be processed, and the names of those files which can be loaded are read into a file name register, depending on results of the determination. Then, at a step D3, a predetermined file name is selected from the file names stored in the file name register (e.g. in the alphabetical order), followed by the program returning to the routine which was interrupted by the present routine (hereinafter referred to as "the original routine").

Figure 7:
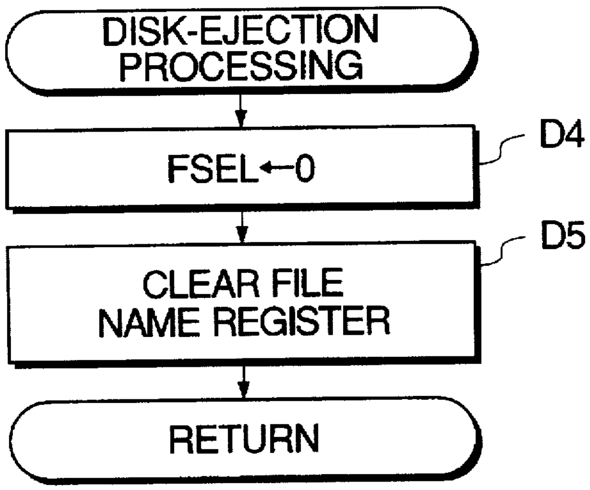
FIG. 7 is a flowchart showing a routine for a disk-ejection processing.

FIG. 7 shows an interrupt handling routine for a disk-ejection processing, which is executed when the disk is removed from the floppy disk drive 8. At a step D4, the flag FSEL is reset to "0", to disable the file selection, and at a step D5, the file name register is cleared, followed by the program returning to the original routine.

By the routines of FIGS. 6 and 7 described above, names of files which can be loaded are stored in the file name register when a disk is inserted into the floppy disk drive 8 and held in the register until the disk is removed from the floppy disk drive 8.

Figure 8:
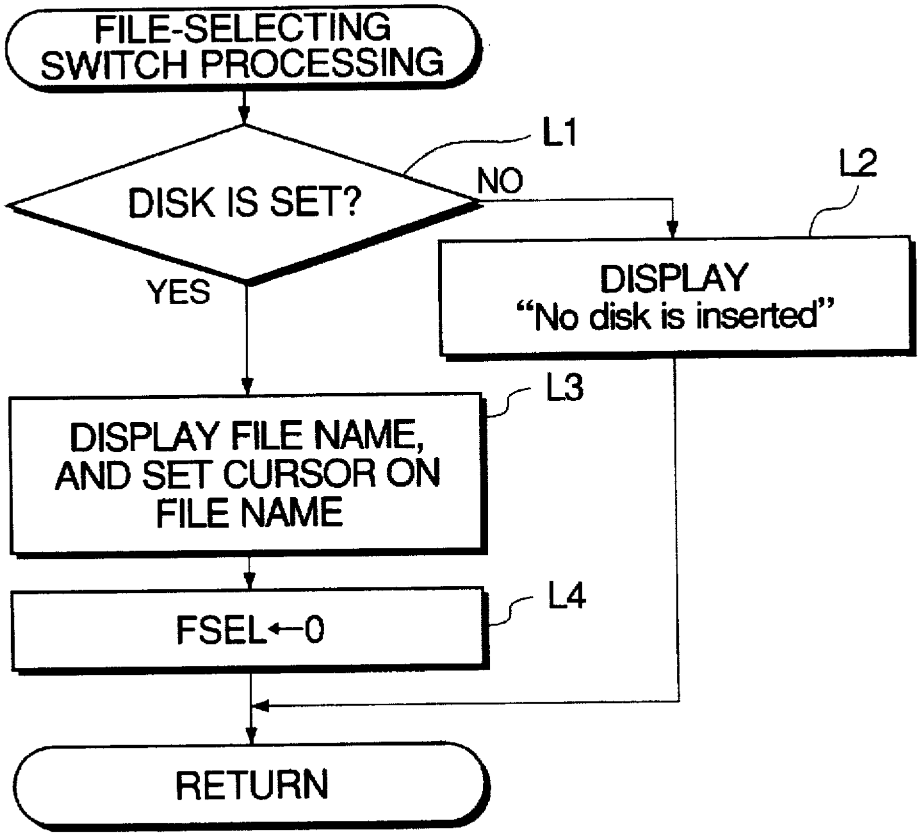
FIG. 8 is a flowchart showing a file-selecting switch processing.

FIG. 8 shows a subroutine for a file-selecting switch processing, which is executed at the step M3 of the main routine when an on event of the file-selecting switch 7*a* is detected. First, at a step L1, it is determined whether or not a disk is in the floppy disk drive 8. If no disk is in the floppy disk drive 8, a message "No disk inserted." is displayed on the LCD display 10, at a step L2, followed by the program returning to the main routine, whereas if a disk is in the floppy disk drive 8, the file names stored in the file name register are displayed on the LCD display 10, and a cursor is set to the location of a file name selected by the operator, at a step L3. Then, the flag FSEL is set to "1" at a step L4, followed by the program returning to the main routine.

Figure 9:
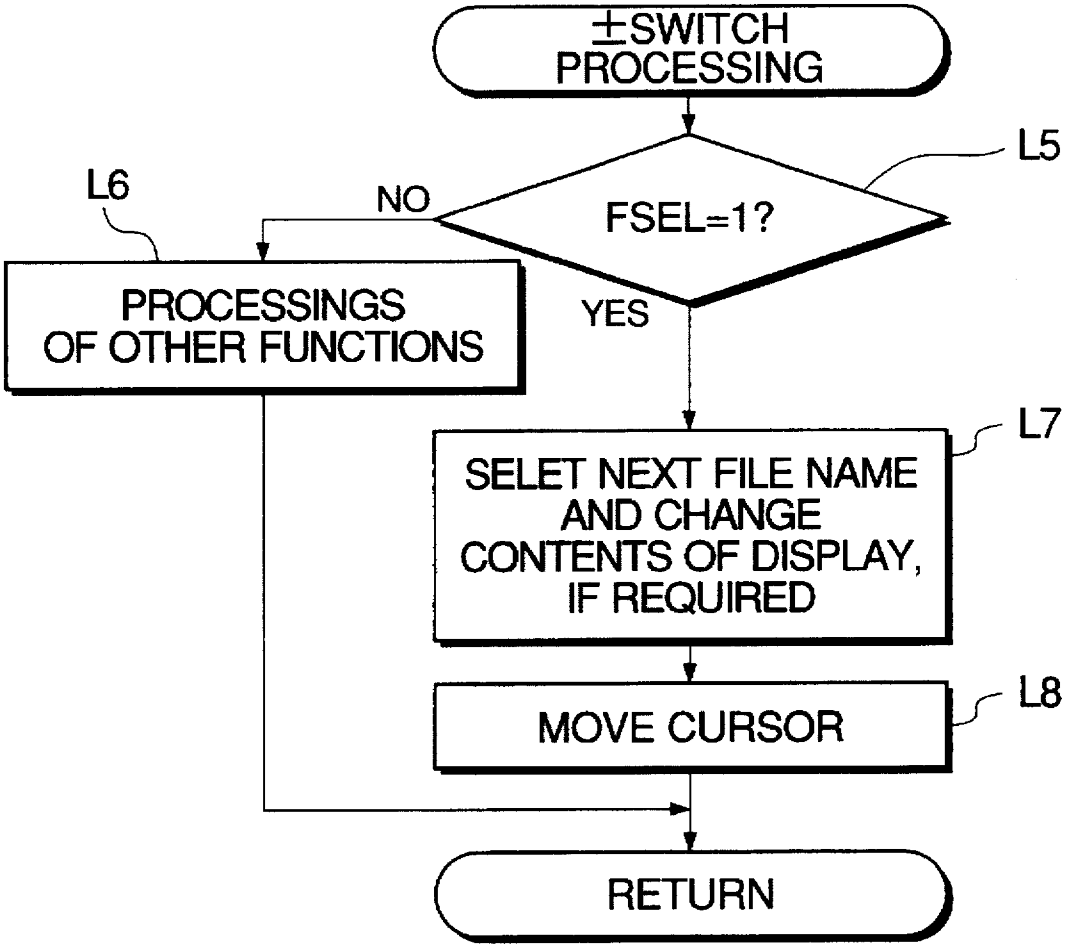
FIG. 9 is a flowchart showing a ± switch routine.

FIG. 9 shows a subroutine for a ± switch processing, which is executed at the step M3 of the main routine when an on event of the ± switch 7*b* is detected. First, at a step L5, it is determined whether or not FSEL=1 holds. If FSEL=1 does not hold, it means that the file selection has been disabled, and then the program proceeds to a step S6, wherein other processings related to the ± switch 7*b* are carried out, followed by the program returning to the main routine. On the other hand, if FSEL=1 holds, which means that the file selection is enabled, the program then proceeds to a step L7, wherein the next file name is selected and the contents of display on the LCD display 10 are changed if required, such as in the case where the selected next file name is not displayed. Then, at a step L8, the cursor is moved to the location of the selected next file name, followed by the program returning to the main routine.

Figure 10:
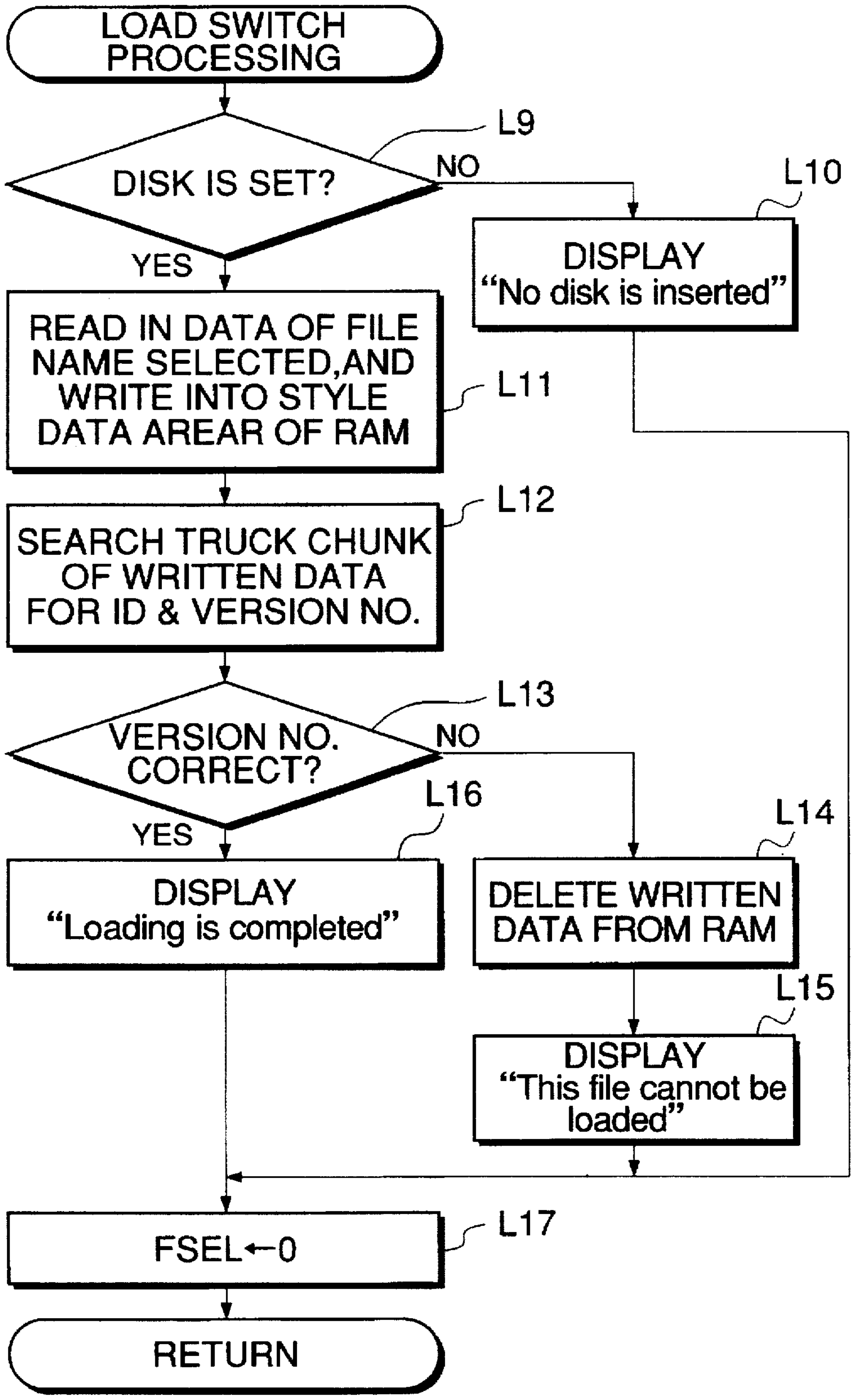
FIG. 10 is a flowchart showing a load switch processing.

FIG. 10 shows a subroutine for a load switch processing, which is executed at the step M3 of the main routine when an on event of the load switch 7*c* is detected. First, at a step L9, it is determined whether or not a disk is in the floppy disk drive 8. If no disk is in the floppy disk drive 8, the message of "No disk is inserted." is displayed on the LCD display 10 at a step L10, and the flag FSEL is set to "0" at a step S17 to disable the file selection, followed by the program returning to the main routine.

On the other hand, if a disk is in the floppy disk drive 8, file data (automatic accompaniment performance data) having a file name currently selected is read from the disk and written into a style data area of the RAM 3 at a step L11. Then, at a step L12, data ID and a version number are searched out from the truck chunk of the written file data. At a step L13, it is determined from the data ID and version number searched out whether or not the written file data is proper automatic accompaniment performance data which can be processed.

If the data ID or the version number is not proper, the data written into the style data area of the RAM 3 is erased at a step L14, and a message of "This file cannot be loaded." is displayed on the LDC display 10 at a step L15. Then, at a step L17, the flag FSEL is reset to "0" to disable the file selection, followed by the program returning to the main routine. On the other hand, if the data ID and the version number are both proper, a message of "Loading is completed." is displayed on the LCD display 10 at a step L16, and the flag FSEL is reset to "0" to disable the file selection at the step L17, followed by the program returning to the main routine.

By the routines of FIGS. 8 to 10 described above, data of a selected file is loaded into the style data area of the RAM 3 if it is automatic accompaniment performance data (style file) having a data version which can be processed. The loaded data is set so as to correspond to the style switch 7*m*1 out of the style switches 7*m*1, 7*m*2, 7*m*3, . . . Files of automatic accompaniment performance data for respective other styles stored in the ROM 2 and having the same format as that shown in FIG. 4 are set so as to correspond to the other style switches 7m2, 7m3, . . . In the present embodiment, files are checked twice before being loaded, as to whether they are proper automatic accompaniment performance data by checking an extension of the file name at the step D2 of the FIG. 6 disk-insertion processing and checking the data ID at the step L13 of the FIG. 10 load switch processing.

Figure 11:
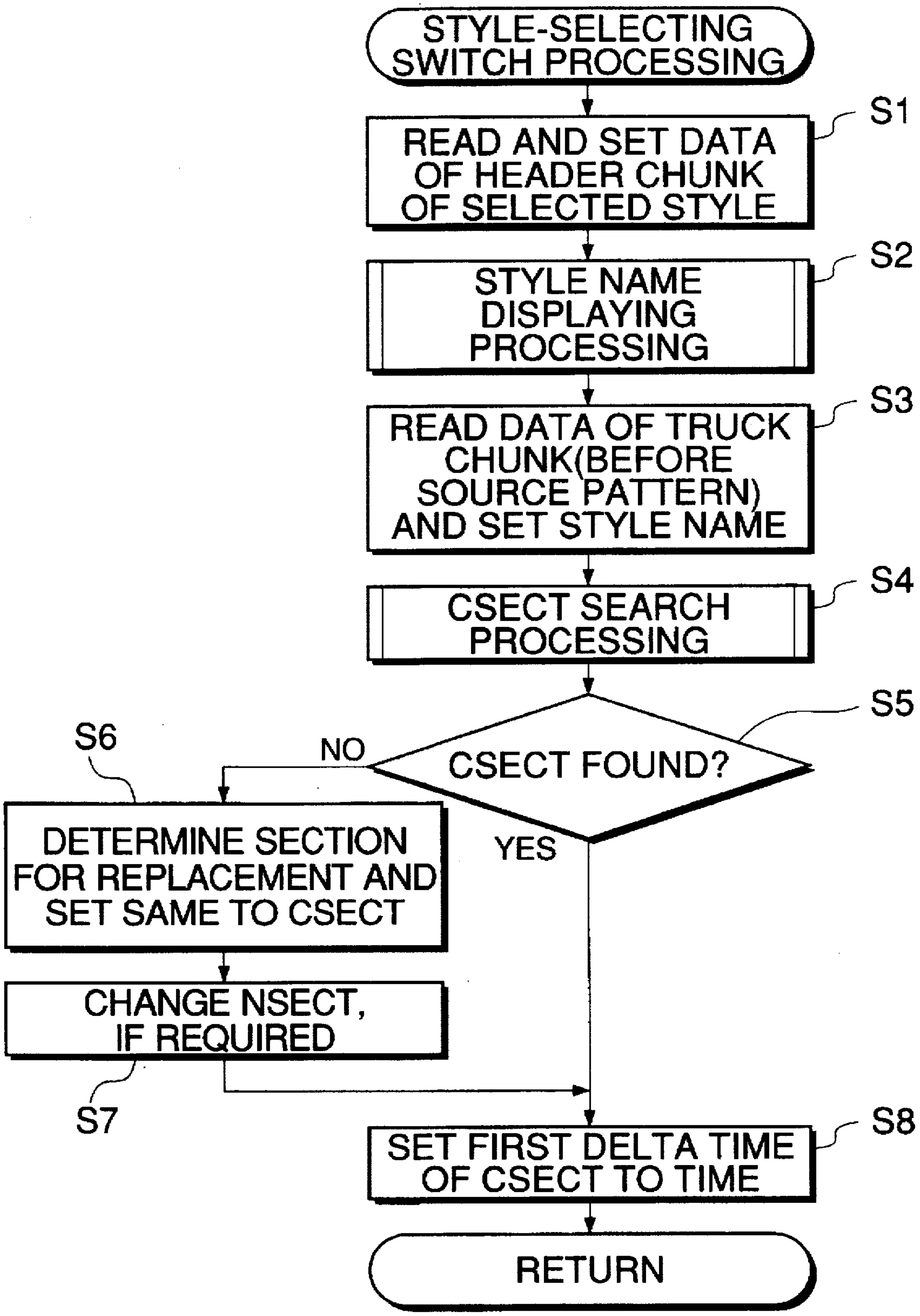
FIG. 11 is a flowchart showing a style-selecting switch processing.

FIG. 11 shows a subroutine for a style-selecting switch processing, which is executed at the step M3 of the main routine when an on event of any of the style switches 7m1, 7m2, 7m3, . . . is detected. First, at a step S1, data of the header chunk of a file for a style selected by one of the style switches 7m1, 7m2, 7m3, . . . is read out and set. Then, at a step S2, a subroutine for a style name-displaying processing is executed, which will be described hereinafter with reference to FIG. 12.

After completion of the style name-displaying processing, data items from the first data item of the truck chunk to a data item immediately before the first section marker of the same are read out and set at a step S3. Then, at a step S4, a subroutine for a CSECT search processing is executed, which will be described hereinafter with reference to FIG. 13. Then, at a step S5, it is determined whether or not data CSECT has been found by the CSECT search processing.

If the data CSECT has been found, the program jumps to a step S8, whereas if the data CSECT has not been found, a new section for replacement is determined according to a predetermined rule and data of the determined section and data of a variation thereof are set into the register CSECT at a step S6. At a step S7, the contents of the register NSECT are changed, if required, and then the program proceeds to the step S8, wherein a delta time at the first location of a source pattern corresponding to the data CSECT is set into the register TIME, followed by the program returning to the main routine.

Figure 12:
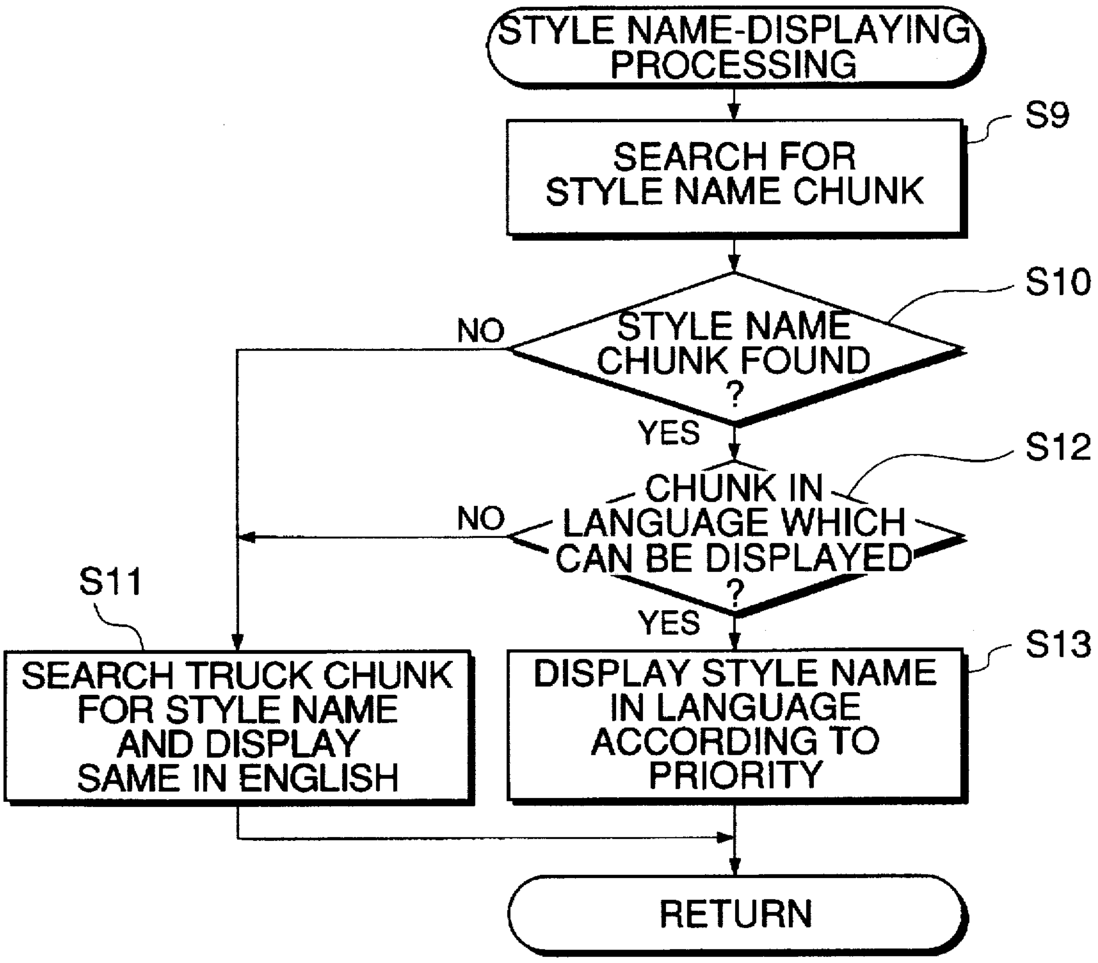
FIG. 12 is a flowchart showing a style name-displaying processing.

FIG. 12 shows the subroutine for the file name-displaying processing. First, at a step S9, the file is searched for a style name chunk corresponding to the selected style, and it is determined at a step S10 whether or not the style name chuck has been found. If the style name chunk has not been found, data of the style name is searched out from the truck chunk, and the style name is displayed in English on the LCD display 10, followed by the program returning to the FIG. 11 routine.

If the style name chunk has been found, it is determined at a step S12 whether or not the language of data of the style name chunk can be displayed by the present electronic musical instrument (i.e. whether or not the instrument has a font for the language). If the data of the style name chuck cannot be displayed, the program proceeds to the step S11, whereas if the data of the style name chuck can be displayed, the style name is displayed on the LCD display 10 in a language according to the order of priority of languages, followed by the program returning to the FIG. 11 routine. The order of priority of languages may be determined by a user or may be set in advance before delivery of the electronic musical instrument, according to the destination.

Figure 13:
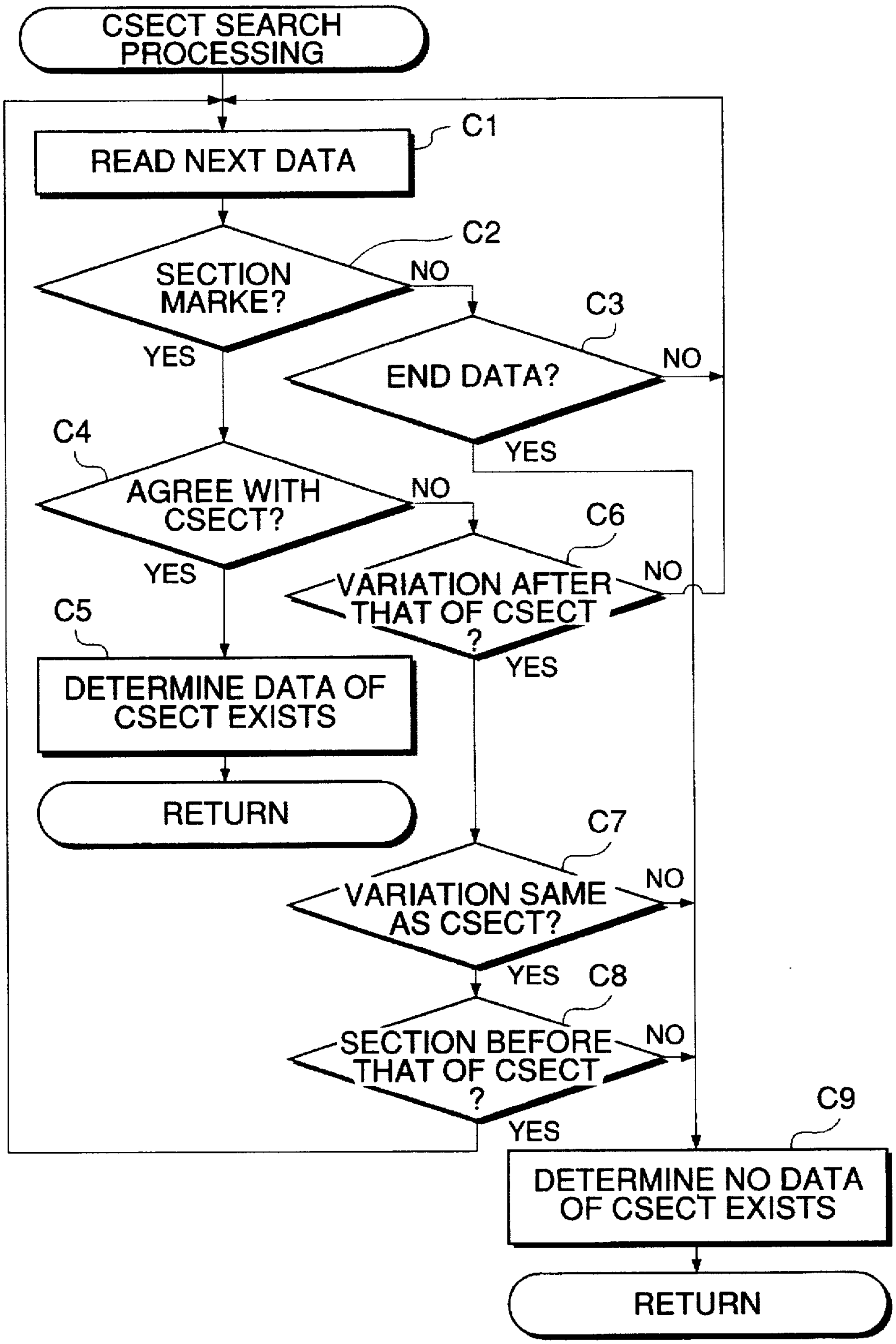
FIG. 13 is a flowchart showing a CSECT search processing.

FIG. 13 shows the subroutine for the CSECT search processing, which is executed at the step S4 of the FIG. 11 style-selecting switch processing or by a pattern changeover processing, described hereinafter, or by a timer interrupt handing routine, described hereinafter. When the CSECT search processing is executed, a reading pointer of the truck chunk is positioned at a location immediately before the first section marker of the file of automatic accompaniment data (hereinafter referred to as "the style file"). Therefore, at a step C1, the next data item of the truck chunk is read out, and it is determined at a step C2 whether or not the read-out data item is a section marker.

If the read-out data item is not a section marker, it is determined at a step C3 whether or not the read-out data item is end-of-truck data (end data). If it is not end data, the program returns to the step C1, whereas if the read-out data item is end data, it is determined at a step C9 that there is no data CSECT, followed by the present program being terminated and returning to the FIG. 11 routine, the pattern changeover processing routine or the timer interrupt handling routine.

On the other hand, if the read-out data item is a section marker, it is determined at a step C4 whether or not the data of the read-out section marker agrees with the data stored in the register CSECT. If the former agrees with the latter, it is determined at a step C5 that there is data CSECT, and the program is terminated, whereas if the former does not agree with the latter, steps C6 et seq. are executed.

At the step C6, it is determined whether or not a variation indicated by the read-out section-marker is one after a variation indicated by the present data CSECT. If the variation indicated by the read-out section marker is not one after the variation indicated by the present data CSECT, the program returns to the step C1, whereas if the variation indicated by the read-out section marker is one after the variation indicated by the present data CSECT, it is determined at a step C7 whether or not the variation indicated by the read-out section marker is identical with the variation indicated by the present data CSECT. If the former is not identical with the latter, it is determined at a step C9 that there is no data CSECT, and the program is terminated, whereas if the former is identical with the latter, it is determined at a step C8 whether or not a section indicated by the read-out section marker is one before a section indicated by the present data CSECT. If the section indicated by the read-out section marker is one before the section indicated by the present data CSECT, the program returns to the step C1, whereas if the section indicated by the read-out section marker is not one before the section indicated by the present data CSECT, it is determined at a step C9 that there is no data CSECT, and the program is terminated.

The above determinations as to "after" or "before" with respect to variations and sections are carried out with reference to the order of arrangement of sections of section-accompaniment performance data and the order of priority of variations, according to which plural section-accompaniment data of the truck chunk are arranged, as described hereinabove with reference to FIG. 4. By thus determining whether the section and variation of the read-out section marker are before or after the section and variation of the present data CSECT, it is possible to quickly carry out the search processing.

More specifically, according to the above CSECT search, when a section marker is found which corresponds to the present data CSECT, it is immediately determined that there is data CSECT, whereas even when a section marker is found, if the section marker does not agree with the present data CSECT, section-accompaniment data are sequentially searched out from the truck chunk. In the flow of the step C6→the step C7→the step C9, when a variation of the section marker read out is determined to be after one of the present data CSECT, it is immediately determined that there is no data CSECT, whereas in the flow of the step S6→the step C7→the step C8→the step C9, even if the variation of the read-out section marker agrees with one of the present data CSECT, it is determined that there is no data CSECT immediately when the section of the read-out section marker is determined to be after one of the present data CSECT. This makes it possible to complete the search more quickly than searching all the data items of the file.

Figure 14:
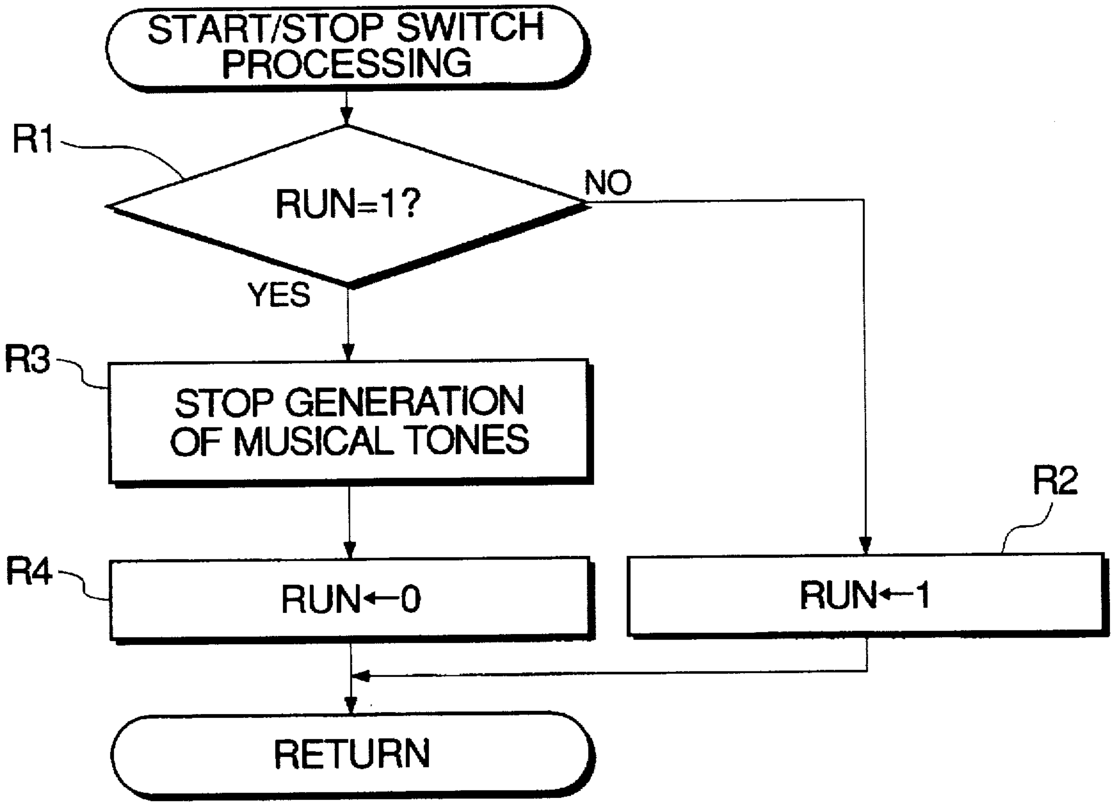
FIG. 14 is a flowchart showing a start/stop switch processing.

FIG. 14 shows a subroutine for a start/stop switch processing, which is executed at the step M3 of the main routine when an on event of the start/stop switch 7d is detected. First, it is determined at a step R1 whether or not RUN=1 holds. If RUN=1 does not hold (i.e. RUN=0 holds), which means that starting of automatic accompaniment performance is instructed during stoppage of automatic accompaniment performance, the flag RUN is set to "1" at a step R2, followed by the program returning to the main routine, whereas if RUN=1 holds, which means that stoppage of automatic accompaniment performance is instructed when automatic accompaniment performance is being given, generation of musical tones is stopped at a step R3, and the flag RUN is set to "0" at a step R4, followed by the program returning to the main routine.

Figure 15:
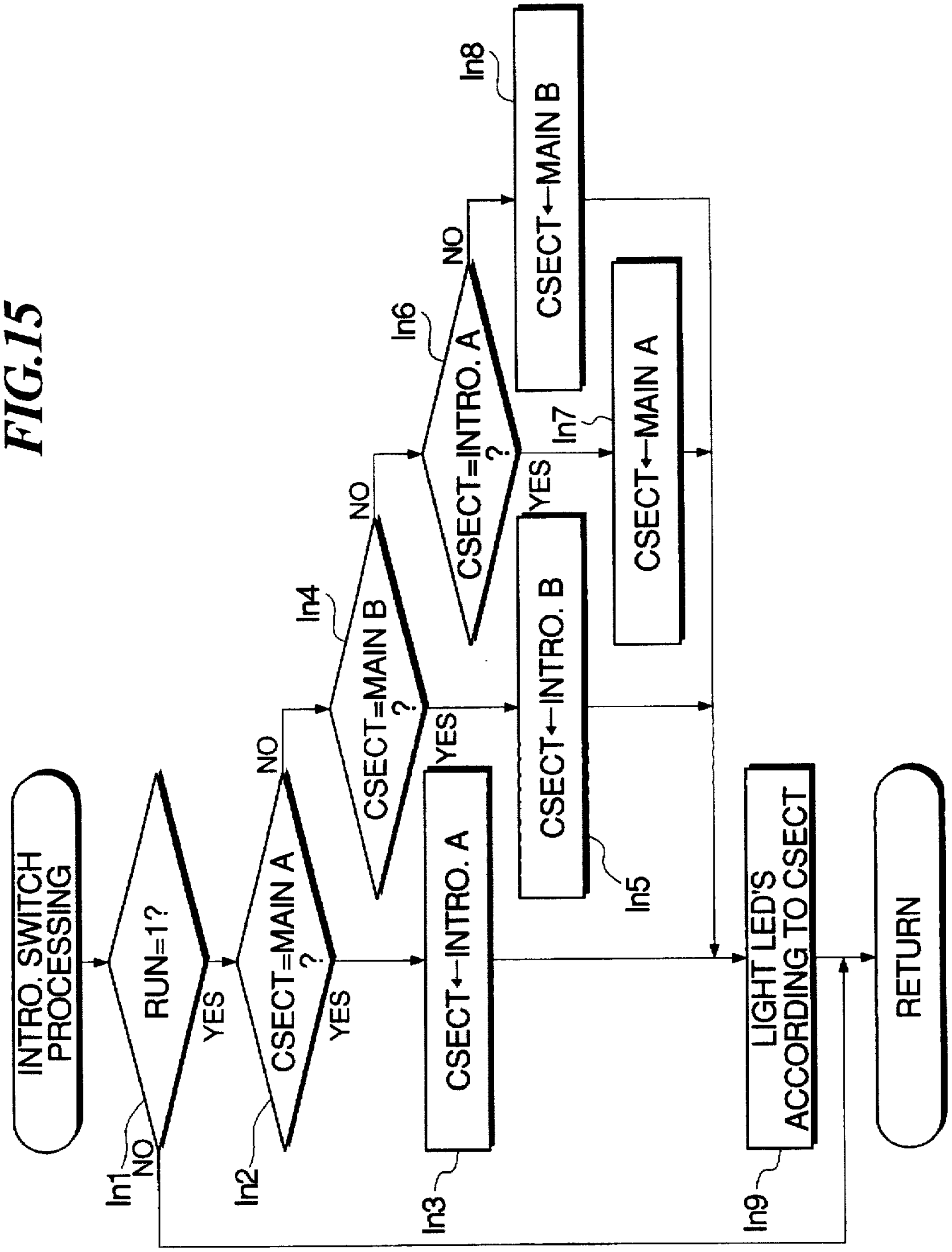
FIG. 15 is a flowchart showing an introduction switch processing.

FIG. 15 shows a subroutine for an introduction switch processing, which is executed at the step M3 of the main routine when an on event of the introduction switch 7e is detected. First, at a step In1, it is determined whether or not RUN=0 holds. If RUN=0 does not hold (i.e. RUN=1 holds), which means that automatic accompaniment performance is being given, the program immediately returns to the main routine, whereas if RUN=0 holds, which means that automatic accompaniment performance is in stoppage, the program proceeds to a step In2 to execute setting of the register CSECT.

At the step In2, it is determined whether or not CSECT= main A holds. If CSECT=main A holds, the section marker of introduction A is set into the register CSECT at a step In3, and the LED's 71*e*, 71*i* alone are lighted at a step In9, followed by the program returning to the main routine. If CSECT=main A does not hold, it is determined at a step In4 whether or not CSECT=main B holds. If CSECT=main B holds, the section marker of introduction B is set into the 15 register CSECT at a step In5, and the LED's 71*e*, 71*j* alone are lighted at the step In9, followed by the program returning to the main routine.

If CSECT=main B does not hold at the step In4, it is determined at a step In6 whether or not CSECT =introduction A holds. If CSECT=introduction A holds, the section marker of main A is set into the register CSECT at a step In7, followed by the program returning to the main routine, whereas if CSECT=introduction A does not hold, the section marker of main B is set into the register CSECT at a step In8, and the LED 71*j* alone is lighted at the step In9, followed by the program returning to the main routine.

According to the above described processing, the operation of the introduction switch 7*e* is made ineffective during automatic accompaniment performance, and when the introduction switch 7*e* is operated during stoppage of automatic accompaniment performance, the section of automatic accompaniment performance is alternately changed over between main and introduction whenever the introduction switch 7*e* is operated, while the current variation (A or B) remains unchanged. Further, on this occasion, the settings of the section and the variation are displayed by the LED's 71*e*, 71I, and 71*j*.

Figure 16:
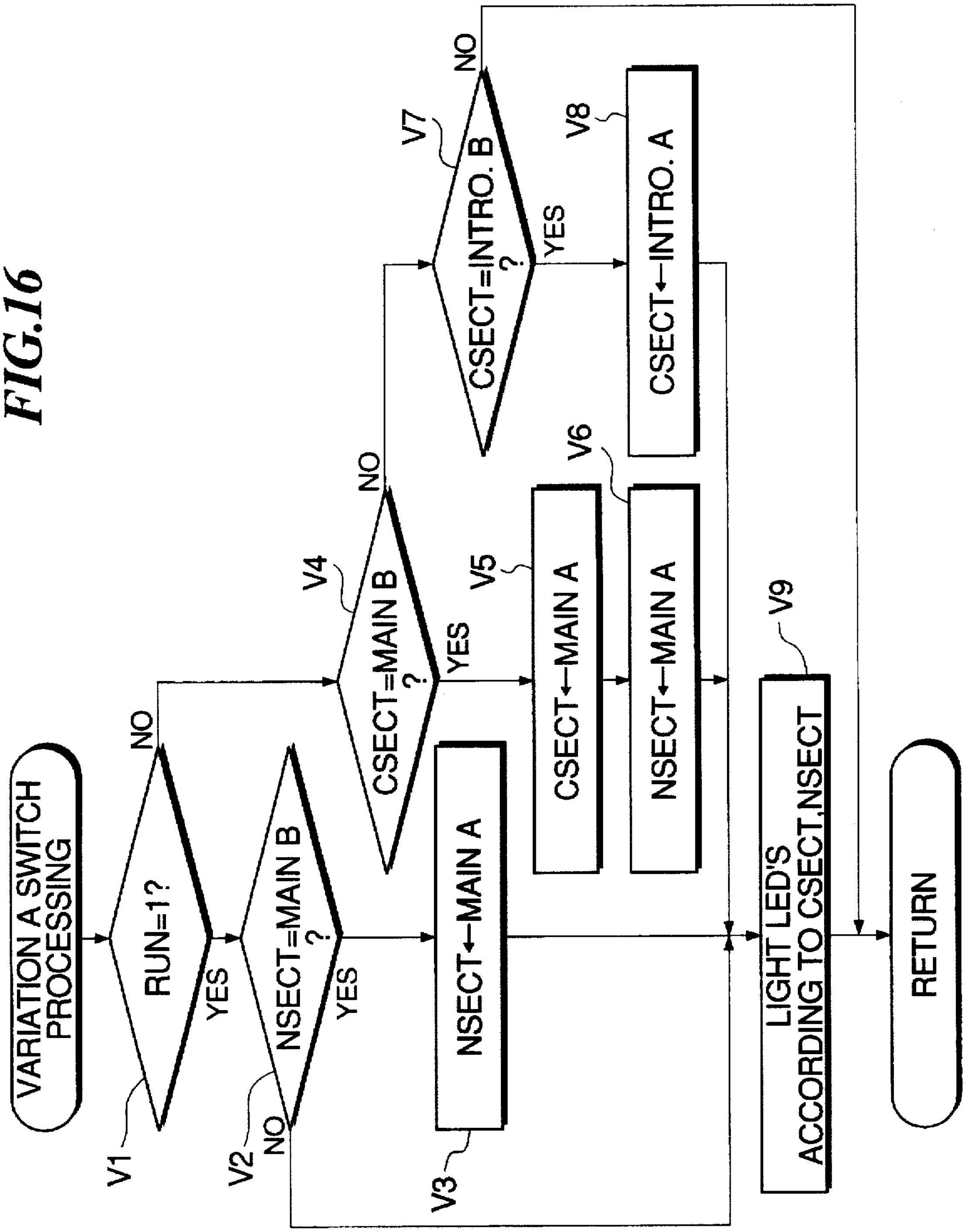
FIG. 16 is a flowchart showing a variation A switch processing.

FIG. 16 shows a subroutine for a variation A switch processing, which is executed at the step M3 of the main routine when an on event of the A switch 7I is detected. First, it is determined at a step V1 whether or not RUN=1 holds. If RUN=1 holds, which means that automatic accompaniment performance is being given, the program proceeds to a step V2, whereas if RUN=1 does not hold (i.e. RUN=0 holds), which means that automatic accompaniment performance is in stoppage, the program proceeds to a step V4.

At the step V2, it is determined whether or not NSECT= main B holds, if NSECT=main B does not hold, the LED 71I is lighted at a step V9, followed by the program returning to the main routine, whereas if NSECT=main B holds, the data of main A is set into the register NSECT at a step V3, and the LED 71I is lighted at the step V9, followed by the program returning to the main routine. If one or more of the LED's 71*e*, 71*f*, 71*g* and 7*h* are lighted, they remain lighted irrespective of the above processing.

On the other hand, at the step V4, it is determined whether or not CSECT=main B holds. If CSECT=main B holds, the data of main A is set into the register CSECT at a step V5, further the same data of main A is set into the register NSECT at a step V6, and the LED 71I alone is lighted at the step V9, followed by the program returning to the main routine.

If CSECT=main B does not hold at the step V4, it is determined at a step V7 whether or not CSECT=introduction B holds. If CSECT=introduction B holds, the data of introduction A is set into the register CSECT at a step V8, and the LED's 71*e*, 71I alone are lighted at the step V9, followed by the program returning to the main routine. If CSECT= introduction B holds at the step V7, the program immediately returns to the main routine.

According to the variation A switch processing described above, if the A switch 7I is operated during automatic accompaniment performance, the data of main A is set for the next section-accompaniment performance, whereas if the A switch 7I is operated during stoppage of automatic accompaniment performance, the data of main A remains set if it is currently set in the register CSECT, and the data of main A is set for the current and next section-accompaniment performances if the data of main B is currently set in the register CSECT. Further, the data of introduction A is set for the current section-accompaniment performance if the data of introduction B is currently set in the register CSECT.

Figure 17:
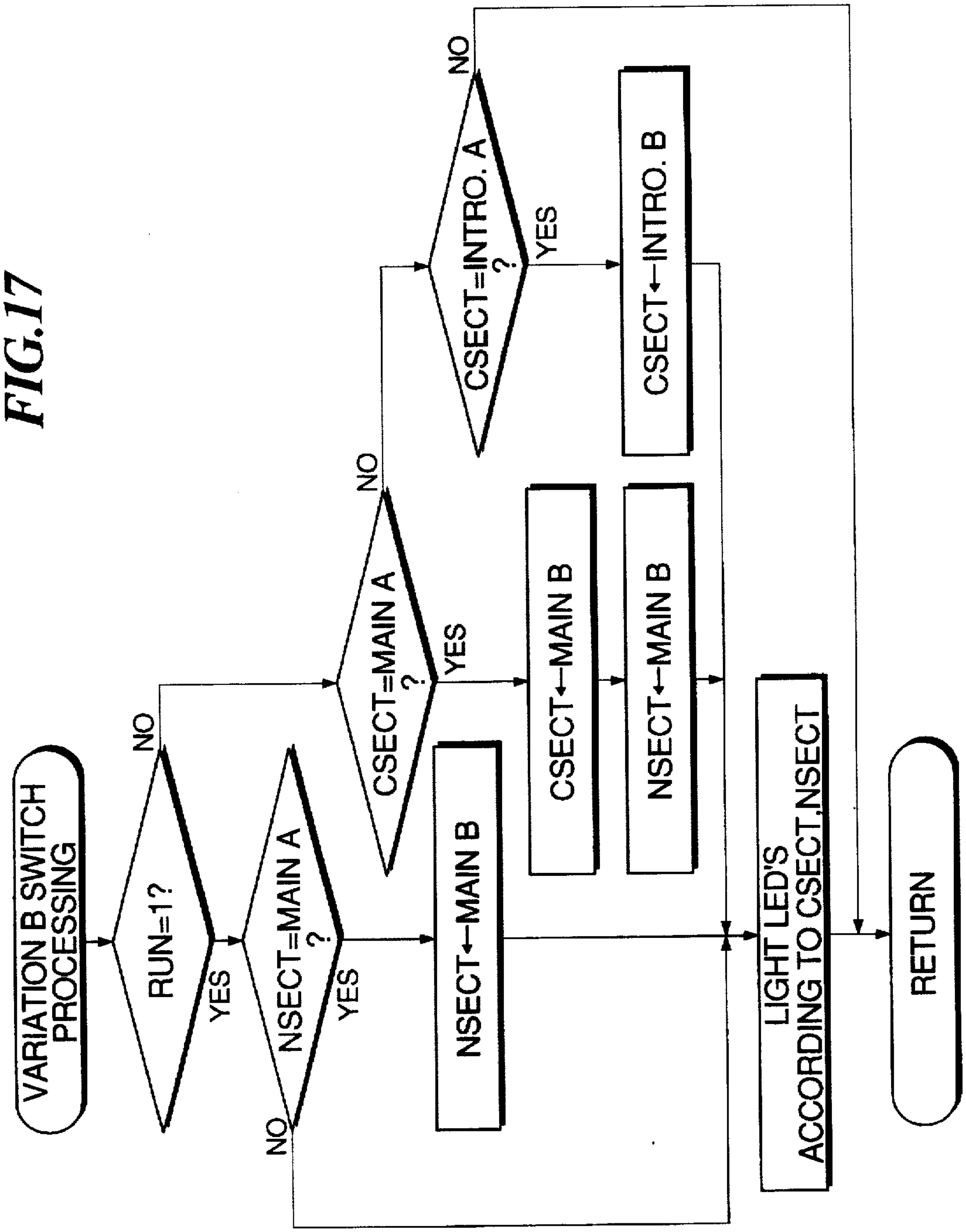
FIG. 17 is a flowchart showing a variation B switch processing.

FIG. 17 shows a subroutine for a variation B switch processing, which is executed at the step M3 of the main routine when an on event of the B switch 7*j* is detected. This processing is identical with the FIG. 16 processing described just above except that the variation A is replaced by the variation B, and vice versa, and hence detailed description thereof is omitted. According to this processing, if the B switch 7*j* is operated during automatic accompaniment performance, the data of main B is set for the next section-accompaniment performance, whereas if the B switch 7*j* is operated during stoppage of automatic accompaniment performance, the data of main B remains set if it is currently set in the register CSECT, and the data of main B is set for the current and next section-accompaniment performances if the data of main A is currently set in the register CSECT. Further, the data of introduction B is set for the current section-accompaniment performance if the data of introduction A is currently set in the register CSECT.

Figure 18:
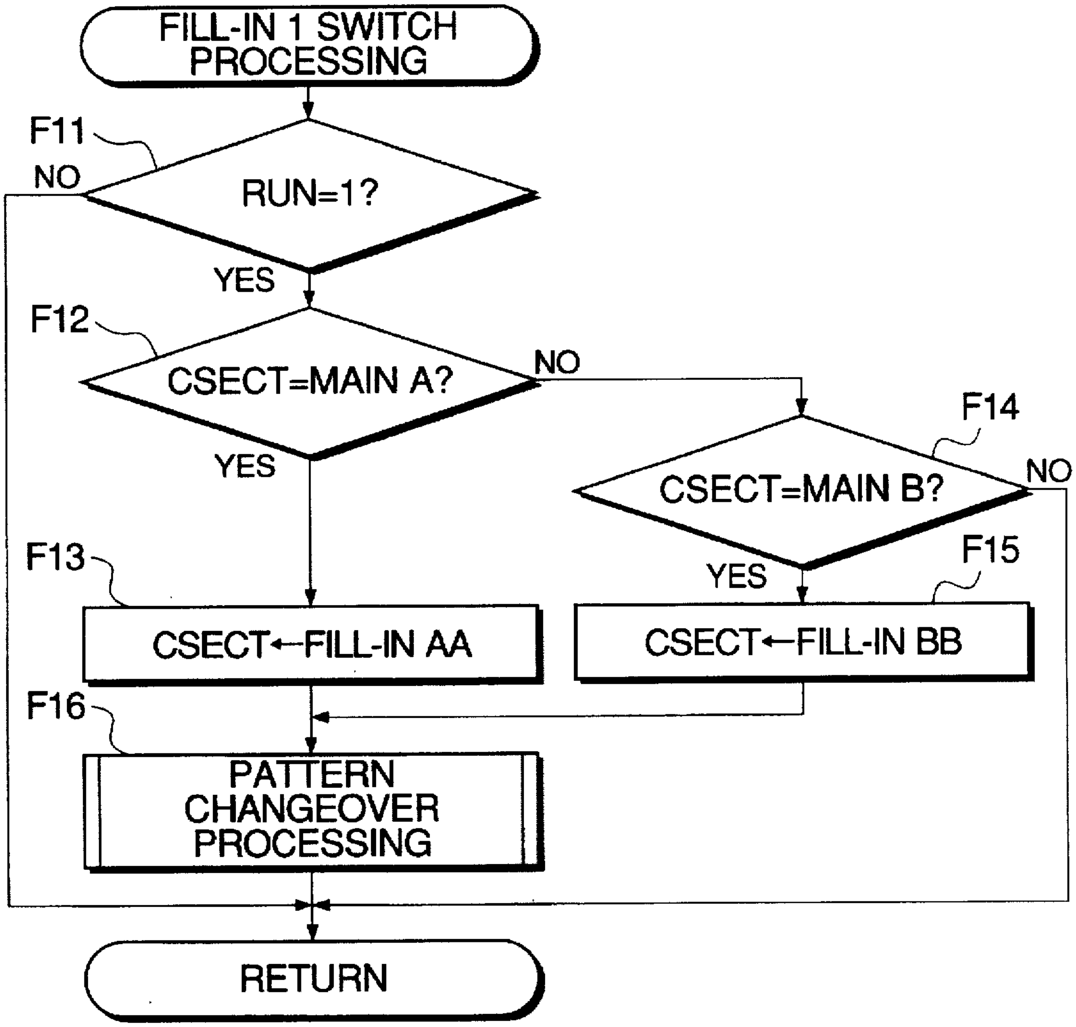
FIG. 18 is a flowchart showing a fill-in 1 switch processing.

FIG. 18 shows a subroutine for a fill-in 1 switch processing, which is executed at the step M3 of the main routine when an on event of the fill-in 1 switch 7*f* is detected. First, at a step F11, it is determined whether or not RUN=1 holds. If RUN=1 does not hold (i.e. RUN=0 holds), which means that automatic accompaniment performance is in stoppage, the program immediately returns to the main routine, whereas if RUN=1 holds, which means that automatic accompaniment performance is being given, the program proceeds to a step F12.

Figure 21:
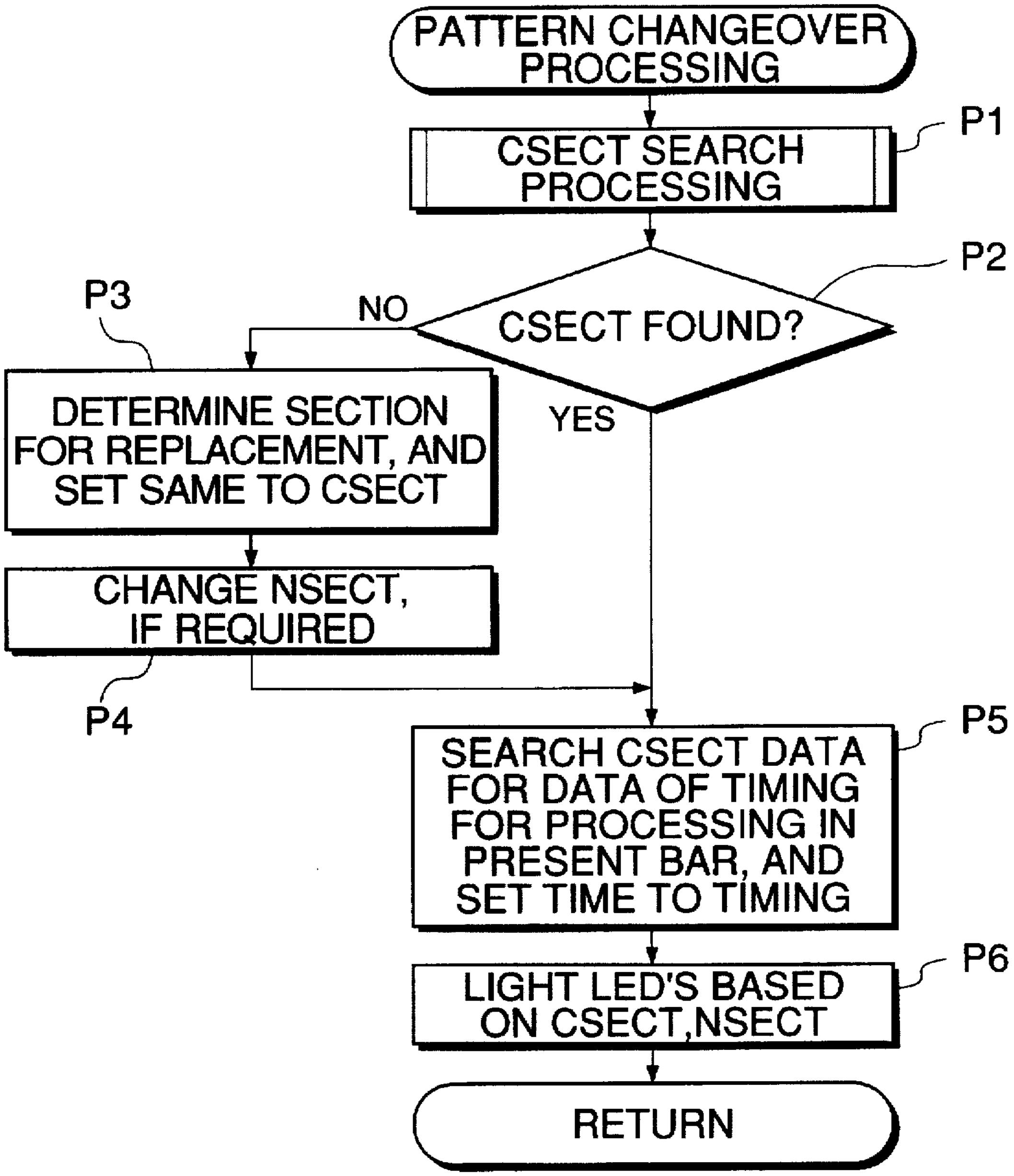
FIG. 21 is a flowchart showing a pattern changeover processing.

At the step F12, it is determined whether or not CSECT= main A holds. If CSECT=main A holds, the data of main AA is set into the register CSECT at a step F13, and a pattern changeover processing, which will be described hereinbelow with reference to FIG. 21, is executed at a step F16, followed by the program returning to the main routine. If CSECT=main A does not hold at the step F12, it is determined at a step F14 whether or not CSECT=main B holds. If CSECT=main does not hold, the program immediately returns to the main routine, whereas if CSECT=main B holds, the data of fill-in BB is set into the register CSECT at a step F15, and the FIG. 21 pattern changeover processing is executed at the step F16, followed by the program returning to the main routine.

According to the fill-in 1 switch processing described above, during stoppage of automatic accompaniment performance, the operation of the fill-in 1 switch *7f* is made ineffective, whereas during automatic accompaniment performance, the data of fill-in AA is set into the register CSECT if the data of main A is currently set therein, but the data of fill-in BB is set into the register CSECT if the data of main B is currently set therein.

Figure 19:
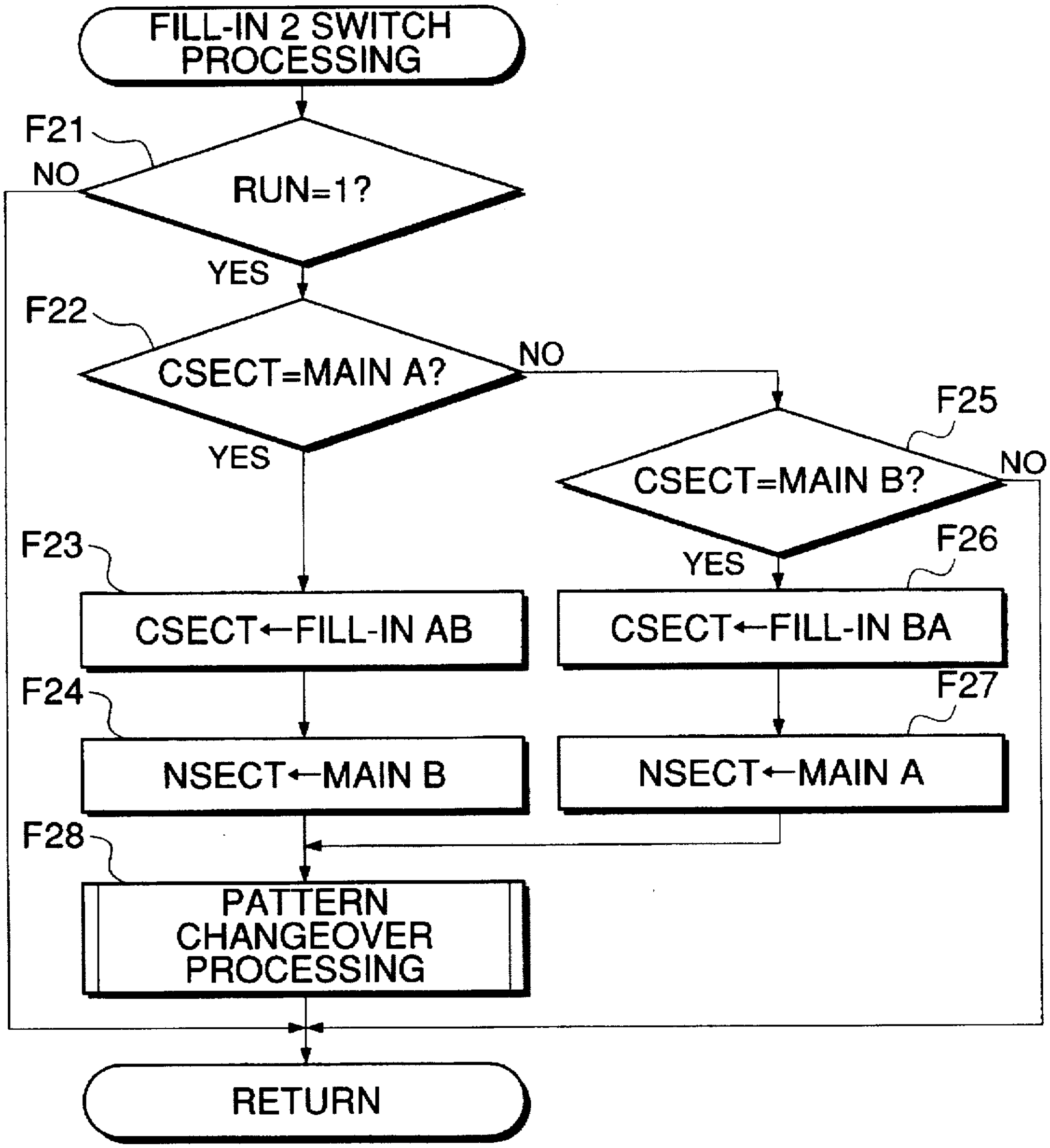
FIG. 19 is a flowchart showing a fill-in 2 switch processing.

FIG. 19 shows a subroutine for a fill-in 2 switch processing, which is executed at the step M3 of the main routine when an on event of the fill-in 2 switch *7g* is detected. First, at a step F21, it is determined whether or not RUN=1 holds. If RUN=1 does not hold (i.e. RUN=0 holds), which means that automatic accompaniment performance is in stoppage, the program immediately returns to the main routine, whereas if RUN=1 holds, which means that automatic accompaniment performance is being given, the program proceeds to a step F22.

At the step F22, it is determined whether or not CSECT= main A holds. If CSECT=main A holds, the data of fill-in AB is set into the register CSECT at a step F23, and the data of main B is set into the register NSECT at a step F24. Then, the FIG. 21 pattern changeover processing is executed at a step F28, followed by the program returning to the main routine. If CSECT=main A does not hold at the step F22, it is determined at a step F25 whether or not CSECT=main B holds. If CSECT=main B does not hold, the program immediately returns to the original routine, whereas if CSECT= main B holds, the data of fill-in BA is set into the register CSECT at a step F26, and the data of main A is set into the register NSECT at a step F27. Then, the FIG. 21 pattern changeover routine is executed at the step F28, followed by the program returning to the main routine.

According to the Fill-in 2 switch processing described above, during stoppage of automatic accompaniment performance, the operation of the fill-in 2 switch *7g* is made ineffective, whereas during automatic accompaniment performance, the data of fill-in AB is set into the register CSECT if the data of main A is currently set therein, but the data of fill-in BA is set into the same if the data of main B is currently set therein.

That is, when the fill-in 1 switch *7f* or the fill-in 2 switch *7g* is operated, the fill-in accompaniment performance of the variation currently set is played, but depending upon the destination variation, when the fill-in 1 switch *7f* is operated, the present variation is continuously selected after completion of the fill-in accompaniment performance, whereas when the fill-in 2 switch *7g* is operated, another variation is selected after completion of the fill-in accompaniment performance.

Figure 20:
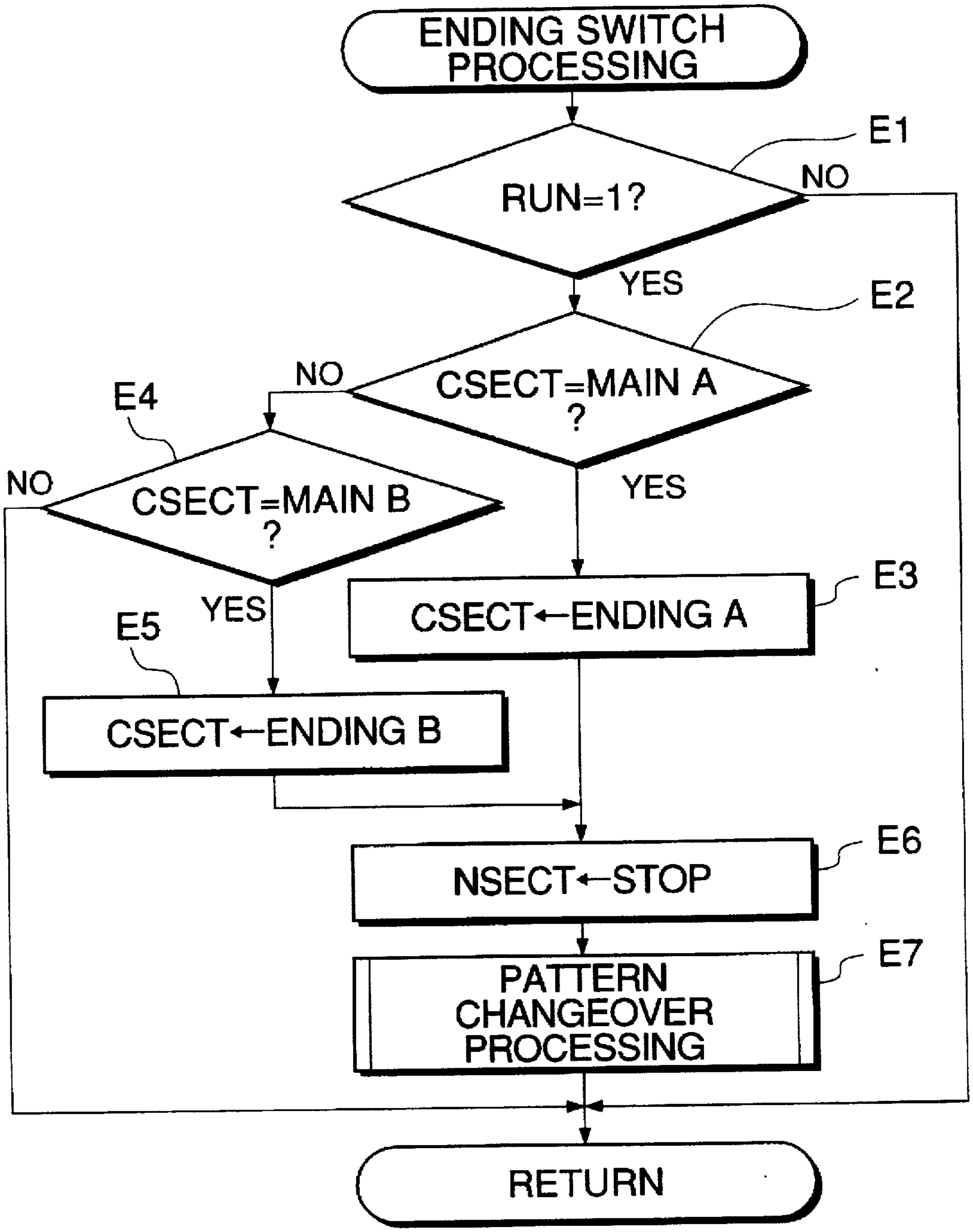
FIG. 20 is a flowchart showing an ending switch processing.

FIG. 20 shows a subroutine for an ending switch processing, which is executed at the step M3 of the main routine when an on event of the ending switch *7h* is detected. First, at a step El, it is determined whether or not RUN=1 holds. If RUN=1 does not hold, which means that automatic accompaniment performance is in stoppage, the program immediately returns to the main routine, whereas if RUN=1 holds, which means that automatic accompaniment performance is being given, the program proceeds to a step E2.

At the step E2, it is determined whether or not CSECT= main A holds. If CSECT=main A holds, data of ending A is set into the register CSECT at a step E3, and data of stop is set into the register NSECT at a step E6. Then, the FIG. 21 pattern changeover processing is executed at a step E7, followed by the program returning to the main routine. If CSECT=main does not hold at the step E2, it is determined at a step E4 whether or not CSECT=main B holds. If CSECT=main B does not hold, the program immediately returns to the main routine, whereas if CSECT=main B holds, data of ending B is set into the register CSECT at a step E5, and data of stop is set into the register NSECT at the step E6. Then, the FIG. 21 pattern changeover processing is executed at the step E7, followed by the program returning to the main routine.

According to the ending switch processing described above, during stoppage of automatic accompaniment performance, the operation of the ending switch *7h* is made ineffective, and during automatic accompaniment performance, when the ending switch *7h* is operated, the data of ending A is set into the register CSECT if the data of main A is currently set therein, whereas when the data of ending B is set into the same if the data of main B is set therein. At the same time, the data of stop, which indicates stoppage of automatic accompaniment performance, is set into the register NSECT to inhibit the next section-accompaniment performance.

FIG. 21 shows a subroutine for the pattern changeover processing. First, at a step P1, the CSECT search processing of FIG. 13 is executed. Then, at a step P2, it is determined whether or not data CSECT has been found by the CSECT search processing. If the data CSECT has been found, the program jumps to a step P5, whereas if no data CSECT has been found, the program proceeds to a step P3, wherein a section for replacement is determined according to a predetermined rule, and data of the determined section and data of a variation thereof are set into the register CSECT, and the data NSECT is changed at a step P4, if required, followed by the program proceeding to the step P5.

At the step P5, data corresponding to the present timing within a bar of the musical piece being played is searched out from a source pattern corresponding to the current data CSECT, and the register TIME is set to a value corresponding to this timing. Then, at a step P6, ones of the LED's *71e* to *71j* corresponding to the data CSECT and the data NSECT are lighted, followed by the program returning to the main routine.

According to the pattern changeover processing described above, if a source pattern determined and set by the fill-in 1 switch processing, the fill-in 2 switch processing, or the ending switch processing is not found in the file of the automatic accompaniment performance data, replacement of the section is carried out at the steps P3 and P4, and the accompaniment performance pattern is changed over at timing of operation of the fill-in 1 switch *7f*, the fill-in 2 switch *7g*, or the ending switch *7h* at the step P5.

Figure 22:
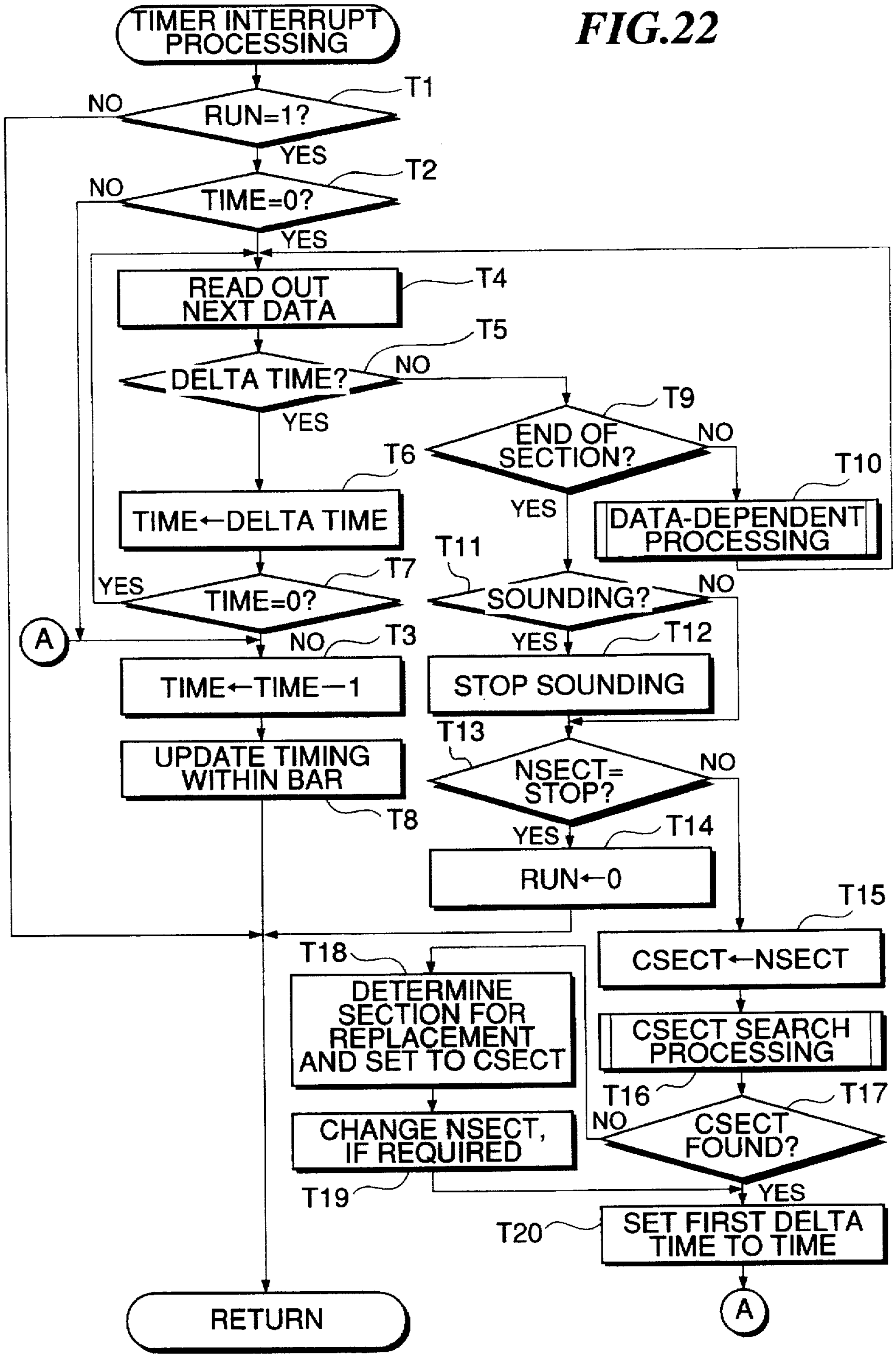
FIG. 22 is a flowchart showing a timer interrupt processing.

FIG. 22 shows a timer interrupt routine, which is executed in response to a timer interrupt signal delivered from the timer 11. First, at a step T1, it is determined whether or not RUN=1 holds. If RUN=1 does not hold, the program immediately returns to the original routine, whereas if RUN=1 holds, data of the source pattern is read out at steps T2 et seq. and processing responsive to events in the source pattern is executed while updating the delta time and the timing for processing within the bar. Further, at the end of each section other than ending, the data CSECT is updated by the data NSECT.

First, at the step T2, it is determined whether not TIME=0 holds. When the automatic accompaniment performance is started, normally the register TIME is set to the first delta time of the source pattern at the step S8 of the FIG. 11 style-selecting switch processing. If TIME=0 does not hold, it is not yet timing for processing the next event data, so that the value TIME is decremented by "1" at a step T3, and a time period elapsed in the present bar is updated at a step T8, followed by the program returning to the original routine. On the other hand, if TIME=0 holds, which means that it is timing for processing the next event data, the program proceeds to a step T4 to execute processing according to an event indicated by the event data.

At the step T4, a data item of the selected source pattern immediately following the data item currently indicated by the reading pointer is read out, and it is determined at a step T5 whether or not the read-out data item is delta time data. This determination is for updating the value TIME by a delta time between adjacent events when delta time data indicative of the delta time is read out.

If it is determined at the step T5 that the read-out data item is not delta time data, processing of event data is carried out at steps T9 et seq. whereas if it is determined that the read data item is delta time data, a delta time indicated by the delta time data is set into the register TIME at a step T6, and then it is determined at a step T7 whether or not TIME=0 holds. If TIME=0 holds, which means that data to be processed at the same timing still remains to be processed, the program returns to the step T4, whereas if TIME=0 does not hold, the program proceeds to the step T3.

On the other hand, at the step T9, it is determined whether or not the end of the section-accompaniment performance data has been reached. This determination is carried out by determining whether or not the next data has been detected. If the end of the section-accompaniment performance data has not been reached, event data processing is executed at a step T10 by executing a subroutine for a data-dependent processing, which will be described hereinafter with reference to FIG. 23, whereas if the end of the section-accompaniment performance data has been reached, the program proceeds to a step T11 for changing over the current section to the next section.

At the step T11, it is determined whether or not a musical tone is being generated. If there is no musical tone being generated, the program jumps to a step T13, whereas if there is a musical tone being generated, note-off data corresponding to the musical tone being generated is generated at a step T12 to stop sounding, and then the program proceeds to the step T13. This processing is for forcibly stopping sounding of a note e.g. when the source pattern currently in use was prepared by cutting out data from a source pattern having a length of several bars, which data contains no note-off data corresponding to the note-on data.

At the step T13, it is determined whether or not NSECT=stop holds. If NSECT=stop holds, the flag RUN is set to "0" at a step T14, followed by the program returning to the original routine. This processing corresponds to the step E6 of the ending switch processing of FIG. 20, whereby when automatic accompaniment performance of ending is terminated, the automatic accompaniment performance is stopped.

If NSECT=stop does not hold at the step T13, the program proceeds to a step T15 to execute changeover of the current section to the next section. At the step T15, the data NSECT is set into the register CSECT, the CSECT search processing of FIG. 13 is executed at a step T16, and it is determined at a step T17 whether or not data corresponding to the data CSECT has been found by the CSECT search processing.

If the data corresponding to the data CSECT has been found, the program proceeds to a step T20, whereas no data corresponding to the data CSECT has been found, a section for replacement is determined according to the predetermined rule and data of the determined section and data of a variation thereof are set into the register CSECT at a step T18, and the data NSECT is changed at a step T19, if required. At the following step T20, the first delta time of the source pattern corresponding to the data CSECT is set into the register TIME, followed by the program returning to the step T3.

Figure 23:
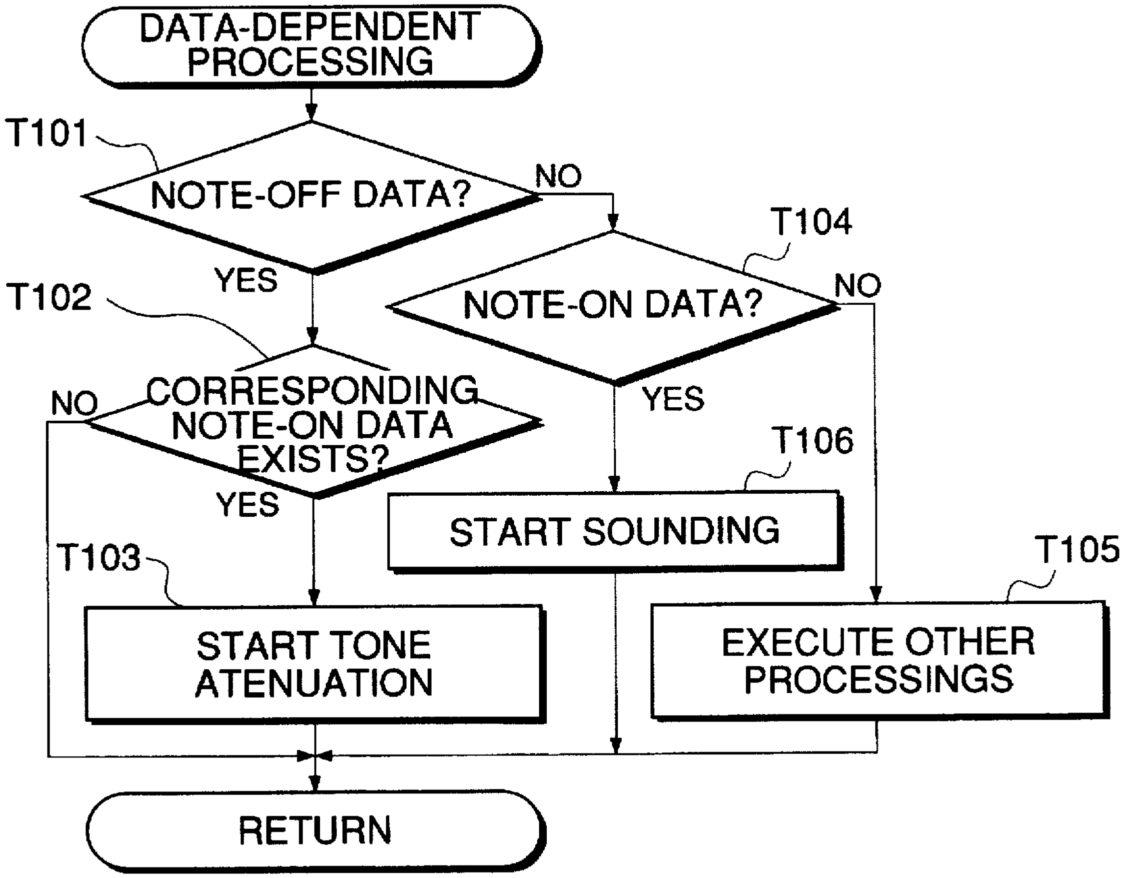
FIG. 23 is a flowchart showing a data-dependent processing.

FIG. 23 shows the subroutine for the data-dependent processing. First, at a step T101, it is determined whether or not the read-out data item is note-off data. If the read-out data item is note-off data, it is determined at a step T102 whether or not a musical tone is being generated or in a note-on status, which corresponds to the note-off data. If no corresponding musical tone is being generated, the program immediately returns to the FIG. 22 routine, whereas if a corresponding musical tone is being generated, sounding of the musical tone is stopped at a step T103, followed by the program returning to the FIG. 22 routine.

If it is determined at the step T101 that the read-out data item is not note-off data, it is determined at a step T04 whether or not the read-out data item is note-on data. If the read-out data item is not note-on data, the program proceeds to a step T105, wherein processing corresponding to the event data is executed, followed by the program returning to the FIG. 22 routine, whereas if the read-out data item is note-on data, the program proceeds to a step T106, wherein sounding is executed based on the note-on data, followed by the program returning to the FIG. 22 routine. In the sounding, pitch conversion is carried out based on a detected chord of the keyboard 4.

According to the above processing described above, data of events are read out from a source pattern corresponding to a designated section marker at timing determined by the delta times of the source pattern to give automatic accompaniment performance. Then, in response to an instruction of changeover of the section by the operator or player, automatic accompaniment performance is given based on a source pattern designated by the instruction, if the designated source pattern exists, and based on a source pattern corresponding to a section marker replaced according to the predetermined rule, if the designated source pattern does not exist.

The following table shows an example of the predetermined rule applied in replacing designated section-accompaniment performance data. If there is shortage in section-accompaniment performance data, i.e. if any designated section-accompaniment performance data is not found, the designated data is replaced by section-accompaniment performance data of a section with a variation nearest thereto, with a variation closer to A being given higher priority. However, in the case of fill-in accompaniment performance data, the designated data is replaced by section-accompaniment performance data of a seciton with a variation identical with the destination variation. Further, in the case where there is no corresponding section-accompaniment performance data to the designated data, data of the main section is used to replace the designated data. As for fill-in, data of the main section having the same destination variation is used.

| Absent section | Countermeasure | No corresponding data |
|---|---|---|
| Main | Data with nearest variation with priority given to one closer to A. | Main |
| Introduction | " | " |
| Ending | " | " |
| Fill-in | Data with nearest variation with priority given to one closer to A, provided that the variation is identical with the destination variation. | " |

As described heretofore, according to the present embodiment, each source pattern of automatic accompaniment performance data is provided with a section marker, which is formed of data indicative of a section and data indicative of a variation. Further, the source patterns are arranged in the order of priority of variations (A→B→C→. . . ). If no designated section-accompaniment performance data is found, the data is replaced according to the order of priority of variations. Therefore, even if different types and numbers of switches, such as a fill-in 1 switch, a fill-in 2 switch, an ending switch, an A switch, and a B switch, are employed for designating automatic accompaniment performance data between different types of apparatuses, it is possible to change the section-accompaniment performance data to a suitable one, which increases the versatility of use of automatic accompaniment performance data.

Further, according to the present embodiment, an extension of a file name of data and data ID are used to discriminate a file, which makes it possible to identify automatic accompaniment performance data which can be processed, without fail.

Further, although in the present embodiment, pattern data for a plurality of performance parts are recorded on a single truck, this is not limitative, but data for different performance parts may be recorded on respective different trucks.

Further, the method and automatic accompaniment apparatus according to the invention may be designed such that a shift or changeover to automatic accompaniment performance of a fill-in section or an ending section can be made during automatic accompaniment performance of an introduction section. Still further, they may be designed such that automatic accompaniment performance can be started with a fill-in section or an ending section. Moreover, they may be designed such that a shift or changeover to automatic accompaniment performance of another section can be made during automatic accompaniment performance of a fill-in section or an ending section.

Besides, a plurality of exclusive section-designating switches may be provided for respective variations of a style.

Although in the embodiment described above, the invention is applied to an electronic musical instrument of a keyboard type, this is not limitative, but it may be applied to performance of so-called computer music by the use of a personal computer or the like.

What is claimed is:

1. A method of processing automatic accompaniment performance data, comprising the steps of:

storing automatic accompaniment performance data for a plurality of accompaniment sections of a musical piece in a memory;

designating a selected accompaniment section;

determining if said selected accompaniment section corresponds to one of said plurality of accompaniment sections stored in said memory;

reading automatic accompaniment performance data for said one accompaniment section that corresponds to said selected accompaniment section from said memory to play an automatic accompaniment performance when a correspondence is found;

selecting a replacement accompaniment section from said plurality of accompaniment sections stored in said memory when a correspondence is not found; and reading automatic accompaniment performance data for said replacement accompaniment section to play an automatic accompaniment performance when a correspondence is not found.

2. A method according to claim 1, wherein said plurality of accompaniment sections include a main section, an introduction section, a fill-in section, and an ending section, and wherein said automatic accompaniment performance data for said replacement accompaniment section is automatic accompaniment performance data for said main section.

3. A method according to claim 1, wherein said automatic accompaniment performance data for said plurality of accompaniment sections comprise a sequence of automatic accompaniment performance data stored as a file, and wherein said sequence of automatic accompaniment performance data includes a pair of a marker and performance data arranged adjacent thereto, said marker discriminating said performance data of said pair thereof from performance data of other automatic accompaniment performance data of said sequence of automatic accompaniment performance data.

4. A method according to claim 3, wherein said marker includes discriminating information indicative of an accompaniment section to which said performance data of said pair thereof corresponds.

5. A method according to claim 3, wherein said file is in a format of a standard MIDI file.

6. A method according to claim 3, wherein said file has a file name having an extension added thereto, said file being employed as said automatic accompaniment performance data when said extension of said file agrees with a predetermined extension.

7. A method according to claim 6, wherein said file includes ID information indicating that said file is said automatic accompaniment performance data, said file being employed as said automatic accompaniment performance data when said extension of said file agrees with said predetermined extension and at the same time said ID information agrees with predetermined ID information.

8. A method according to claim 3, wherein said performance data includes adjacent to said marker includes note-on data and note-off data corresponding thereto, a note-off event being forcedly generated at the end of said performance data during performance thereof when said performance data does not contain said note-off data corresponding to said note-on data.

9. A method of processing automatic accompaniment performance data, comprising the steps of:

storing automatic accompaniment performance data for a plurality of style variations for each of a plurality of accompaniment sections of a musical piece in a memory;

designating a selected style variation;

determining if said selected style variation corresponds to one of said plurality of style variations stored in said memory;

reading automatic accompaniment performance data for said one style variation that corresponds to said selected style variation from said memory to play an automatic accompaniment performance when a correspondence is found;

determining a replacement style variation from said plurality of style variations stored in said memory when a correspondence is not found; and reading automatic accompaniment performance data for said replacement style variation to play an automatic accompaniment performance when a correspondence is not found.

10. A method according to claim 9, wherein said plurality of style variations are given a predetermined order of priority, and wherein said automatic accompaniment performance data for said replacement style variation is for a style variation which is nearest in said predetermined order of priority to said selected style variation.

11. A method according to claim 9, wherein said automatic accompaniment performance data for said plurality of style variations comprise a sequence of automatic accompaniment performance data stored as a file, and wherein said sequence of automatic accompaniment performance data each being formed of a pair of a marker and performance data arranged adjacent thereto, said marker discriminating said performance data of said pair thereof from performance data of other automatic accompaniment performance data of said sequence of automatic accompaniment performance data.

12. A method according to claim 9, wherein said marker includes discriminating information indicative of a style variation to which said performance data of said pair thereof corresponds.

13. A method according to claim 11, wherein said file is in a format of a standard MIDI file.

14. A method according to claim 11, wherein said file has a file name having an extension added thereto, said file being employed as said automatic accompaniment performance data when said extension of said file agrees with a predetermined extension.

15. A method according to claim 14, wherein said file includes ID information indicating that said file is said automatic accompaniment performance data, said file being employed as said automatic accompaniment performance data when said extension of said file agrees with said predetermined extension and at the same time said ID information agrees with predetermined ID information.

16. A method according to claim 11, wherein said performance data arranged adjacent to said marker includes note-on data and note-off data corresponding thereto, a note-off event being forcedly generated at the end of said performance data during performance thereof when said performance data does not contain said note-off data corresponding to said note-on data.

17. A method according to claim 11, wherein said plurality of style variations are variations of each of a plurality of styles of music, said file storing information on a name of one of said plurality of styles of music in a first natural language, and information on said name of said one of said plurality of styles of music in a second natural language, if required, said name of said one of said plurality of styles of music of said automatic accompaniment performance data being displayed in said second natural language when an apparatus using data of said file is capable of displaying said name of said each of said plurality of styles of music in said second natural language, whereas said name of said one of said plurality of styles of music of said automatic accompaniment performance data being displayed in said first natural language when said apparatus using data of said file is not capable of displaying said name of said each of said plurality of styles of music in said second natural language.

18. An automatic accompaniment performance apparatus, comprising:

memory means for storing automatic performance data for a plurality of accompaniment sections of a musical piece;

designating means for designating a selected accompaniment section;

determining means for determining whether one of said plurality of accompaniment sections stored is said memory corresponds to said selected accompaniment section designated by said designating means;

changeover means for changing said selected accompaniment section to a predetermined replacement accompaniment section selected from said plurality of accompaniment sections stored in said memory means when said determining means determines that said selected accompaniment section does not correspond to one of said plurality of accompaniment sections stored is said memory means;

reading means for reading said automatic accompaniment performance data for at least one of said replacement accompaniment section when said determining means finds no correspondence and said one accompaniment section that corresponds to said selected accompaniment section section when said determining means finds a correspondence; and output means for delivering musical tone information based on said automatic accompaniment performance data read by said reading means.

19. An automatic accompaniment performance apparatus according to claim 18, wherein said plurality of accompaniment sections include a main section, an introduction section, a fill-in section, and an ending section, and wherein said changeover means selects said main section as said replacement accompaniment section.

20. An automatic accompaniment performance apparatus, comprising:

memory means for storing automatic performance data for a plurality of style variations for each of a plurality of accompaniment sections of a musical piece;

designating means for designating a selected style variation;

determining means for determining whether one of said plurality of style variations stored in said memory means corresponds to said selected style variation;

changeover means for changing said selected style variation to a predetermined replacement accompaniment section selected from said plurality of style variations stored in said memory means when said determining means determines that said selected style variation does not correspond to one of said plurality of style variation stored in said memory means;

reading means for reading said automatic accompaniment performance data for at least one of said replacement accompaniment section and said one accompaniment section that corresponds to said selected accompaniment section; and output means for delivering musical tone information based on said automatic accompaniment performance data read by said reading means.

21. An automatic accompaniment apparatus according to claim 20, wherein said plurality of style variations are given a predetermined order of priority, and wherein said changeover means selects a replacement style variation that corresponds to a style variation which is nearest in said predetermined order of priority to said selected style variation.

22. An automatic accompaniment performance apparatus, comprising:

a memory device which stores automatic performance data for a plurality of accompaniment sections of a musical piece;

a designating device which designates a selected accompaniment section;

a determining device which determines whether said selected accompaniment section corresponds to one of said plurality of accompaniment sections stored in said memory device;

a changeover device which changes said selected accompaniment section to a predetermined replacement section selected from said plurality of accompaniment sections stored in said memory device when said determining device determines there is no correspondence;

a reading device which reads said automatic accompaniment performance data for said one accompaniment section that corresponds to said selected accompaniment section when there is a correspondence determined by said determining device and which reads automatic accompaniment performance data for said replacement accompaniment section when there is no correspondence determined by said determining device; and an output device which delivers musical tone information based on said automatic accompaniment performance data read by said reading device.

23. An automatic accompaniment performance apparatus, comprising:

a memory device which stores automatic performance data for a plurality of style variations for each of a plurality of accompaniment sections of a musical piece;

a designating device which designates a selected style variation;

a determining device which determines whether the selected style variation is one of the plurality of style variations stored in said memory device;

a changeover device which changes said selected style variation to a predetermined replacement style variation chosen from said plurality of style variations stored in said memory device when said determining device determines that said selected style variation is not stored in said memory device;

a reading device which reads said automatic accompaniment performance data for said style variation that corresponds to the selected style variation when the determining device determines there is a correspondence and which reads automatic accompaniment performance data for said replacement style variation when said determining device determines there is no correspondence; and an output device which delivers musical tone information based on said automatic accompaniment performance data read by said reading device.

* * * * *